United States Patent
Fattal et al.

(10) Patent No.: US 11,048,037 B2
(45) Date of Patent: Jun. 29, 2021

(54) BACKLIGHT, MULTIVIEW DISPLAY AND METHOD EMPLOYING TAPERED COLLIMATOR

(71) Applicant: LEIA INC., Menlo Park, CA (US)

(72) Inventors: David A. Fattal, Mountain View, CA (US); Ming Ma, Palo Alto, CA (US); Xuejian Li, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 16/576,685

(22) Filed: Sep. 19, 2019

(65) Prior Publication Data

US 2020/0012034 A1 Jan. 9, 2020

Related U.S. Application Data

(63) Continuation of application No. PCT/US2017/025622, filed on Mar. 31, 2017.

(51) Int. Cl.
  *F21V 7/04* (2006.01)
  *F21V 8/00* (2006.01)
(52) U.S. Cl.
  CPC ......... *G02B 6/0036* (2013.01); *G02B 6/0028* (2013.01)
(58) Field of Classification Search
  CPC ...... H04N 13/312; H04N 13/32; H04N 13/31; H04N 2013/405; H04N 13/00;
  (Continued)

(56) References Cited

U.S. PATENT DOCUMENTS

| 5,359,691 A | 10/1994 | Tai et al. |
| 5,462,700 A | 10/1995 | Beeson |

(Continued)

FOREIGN PATENT DOCUMENTS

| CN | 103885170 A | 6/2014 |
| JP | 2005108512 A | 4/2005 |

(Continued)

OTHER PUBLICATIONS

International Search Report and Written Opinion (ISRWO) by International Searching Authority (ISA) Korean Intellectual Property Office (KIPO), dated Dec. 27, 2017 (17 pages) for counterpart parent International Application No. PCT/US2017/025622.

(Continued)

*Primary Examiner* — William J Carter
*Assistant Examiner* — Omar Rojas Cadima
(74) *Attorney, Agent, or Firm* — J. Michael Johnson

(57) ABSTRACT

A backlight and a multiview display employ a light guide having angle-preserving scattering feature and a tapered collimator. The angle-preserving scattering feature is configured to scatter a portion of guided light out of the light guide as emitted light. The tapered collimator is configured to collimate light provided by a light source as collimated light and to communicate the collimated light to the light guide to be guided as the guided light. The collimated light has a collimation factor configured to provide a predetermined angular spread of the guided light, the collimation factor being a function of a taper of the tapered collimator. The multiview display includes multiview pixels that include view pixels as well as the angle-preserving scattering feature that includes a multibeam element having a size that is comparable to a size of a view pixel.

26 Claims, 10 Drawing Sheets

(58) Field of Classification Search
CPC .. H04N 13/305; H04N 13/351; H04N 13/354; H04N 13/368; G02F 1/133504; G02F 2001/133607; G02F 2201/305; G02F 1/133615; G02B 6/0036; G02B 6/0028; G02B 6/0035; G02B 6/0025; G02B 6/0038; G02B 6/0016; G02B 27/42; G02B 30/00; G02B 5/1819; G02B 5/045; G02B 5/1842; G02B 6/34; G02B 30/33; G02B 6/0013; F21V 7/04; F21V 2200/15

See application file for complete search history.

(56) References Cited

U.S. PATENT DOCUMENTS

| | | |
|---|---|---|
| 6,327,091 B1 | 12/2001 | Agano |
| 6,421,103 B2 | 7/2002 | Yamaguchi |
| 7,223,010 B2 | 5/2007 | Min et al. |
| 7,540,646 B2 | 6/2009 | Naoi |
| 9,128,226 B2 | 9/2015 | Fattal et al. |
| 9,201,270 B2 | 12/2015 | Fattal et al. |
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 2007/0081360 A1 | 4/2007 | Bailey et al. |
| 2010/0309688 A1 | 12/2010 | Montgomery et al. |
| 2014/0233260 A1 | 8/2014 | Ahlgren et al. |
| 2015/0036068 A1 | 2/2015 | Fattal et al. |
| 2015/0301261 A1 | 10/2015 | Nevitt et al. |
| 2016/0209574 A1 | 7/2016 | Powell et al. |
| 2017/0010400 A1 | 1/2017 | Bang et al. |
| 2017/0090096 A1 | 3/2017 | Fattal |
| 2018/0164489 A1 | 6/2018 | Fattal et al. |
| 2018/0164490 A1 | 6/2018 | Ma et al. |
| 2018/0188441 A1 | 7/2018 | Fattal |
| 2018/0299608 A1 | 10/2018 | Fattal et al. |
| 2019/0025494 A1 | 1/2019 | Fattal et al. |
| 2019/0155105 A1 | 5/2019 | Aieta et al. |
| 2019/0196091 A1 | 6/2019 | Li et al. |
| 2019/0227335 A1 | 7/2019 | Fattal |
| 2019/0227363 A1 | 7/2019 | Fattal et al. |

FOREIGN PATENT DOCUMENTS

| | | |
|---|---|---|
| WO | 20080659906 A1 | 6/2008 |
| WO | 2017041073 A1 | 3/2017 |
| WO | 2018067381 A1 | 4/2018 |
| WO | 2018182991 A1 | 10/2018 |
| WO | 2018186955 A1 | 10/2018 |
| WO | 2018226235 A1 | 12/2018 |
| WO | 2019066873 A1 | 4/2019 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Lee, Chi-Hung, Angularly positioned LED-based spatial-temporal color separation system, Optics Express, Aug. 2012, pp. 19109-19118, vol. 20, No. 17.

BACKLIGHT, MULTIVIEW DISPLAY AND METHOD EMPLOYING TAPERED COLLIMATOR

CROSS-REFERENCE TO RELATED APPLICATIONS

This application is a continuation patent application of and claims the benefit of priority to International Application No. PCT/US2017/025622, filed Mar. 31, 2017, the entirety of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting having angle preserving scattering and employing a tapered collimator with application to electronic displays and, in particular, multiview displays. In various embodiments consistent with the principles described herein, a backlight employing an angle-preserving scattering feature is provided. The angle-preserving scattering feature is configured to provide emitted light that may have light beams with a plurality of different principal angular directions, in some embodiments. The different principal angular directions of the light beams of the emitted light may correspond to directions of various different views of a multiview display, for example. Further, according to various embodiments, a tapered collimator is employed to provide collimated light to the backlight. The tapered collimator may facilitate or provide substantially uniform spatio-angular illumination of the backlight, according to various embodiments.

Figure 1A:
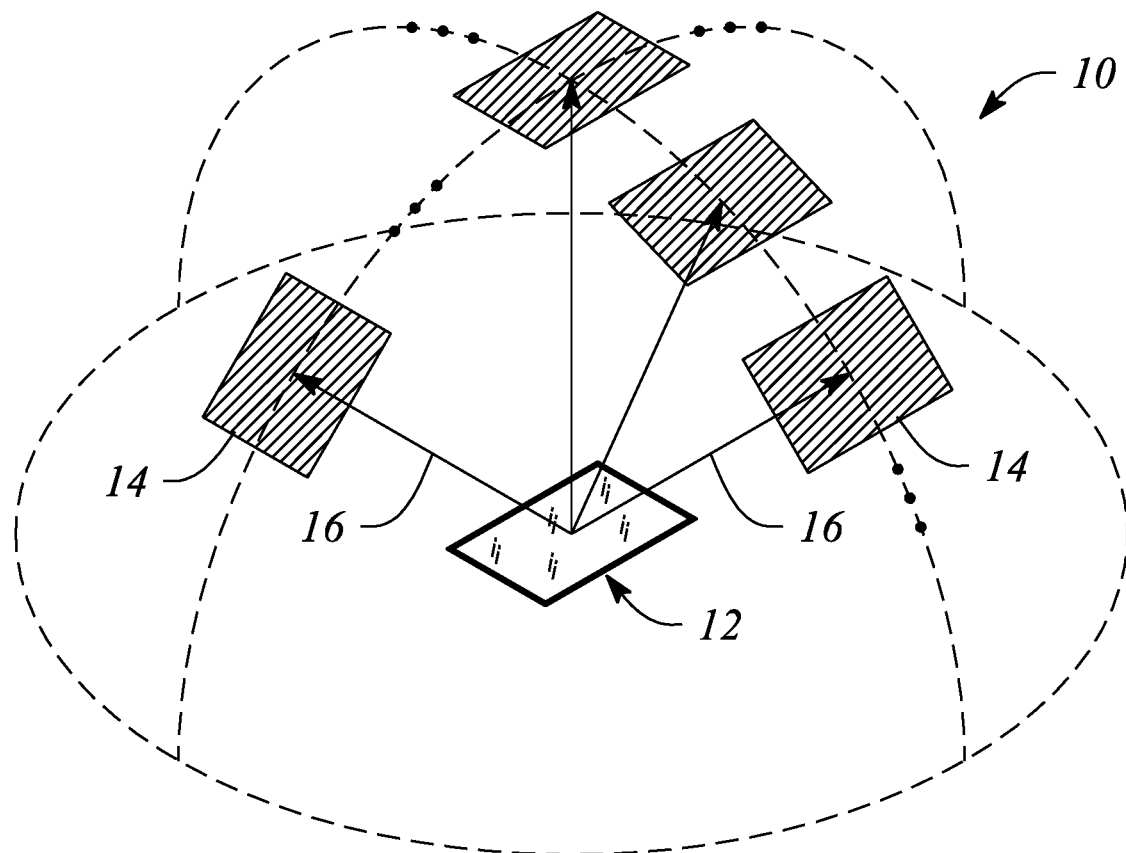
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

Figure 1B:
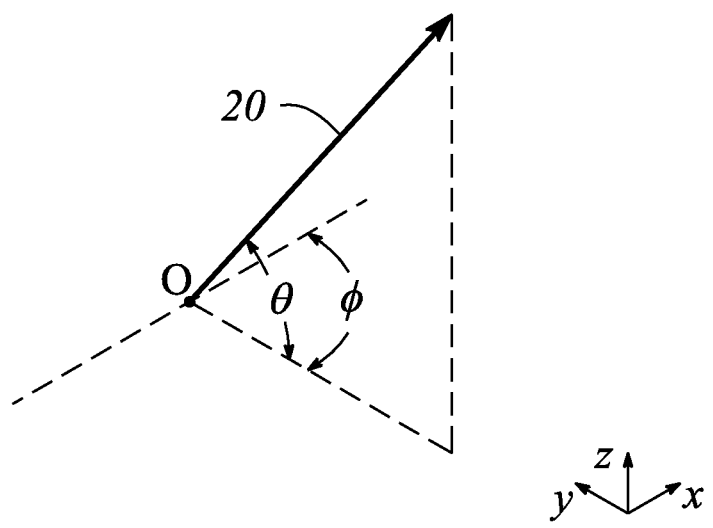
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of view pixels representing 'view' pixels in each of a similar plurality of different views of a multiview display. In particular, a multiview pixel may have an individual view pixel corresponding to or representing a view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels represented by the view pixels of a multiview pixel may have equivalent or at least substantially similar locations or coordinates in each of the different views. For example, a first multiview pixel may have individual view pixels corresponding to view pixels located at $\{x_1, y_1\}$ in each of the different views of a multiview image, while a second multiview pixel may have individual view pixels corresponding to view pixels located at $\{x_2, y_2\}$ in each of the different views, and so on.

In some embodiments, a number of view pixels in a multiview pixel may be equal to a number of views of the multiview display. For example, the multiview pixel may provide sixty-four (64) view pixels in associated with a multiview display having 64 different views. In another example, the multiview display may provide an eight by four array of views (i.e., 32 views) and the multiview pixel may include thirty-two 32 view pixels (i.e., one for each view). Additionally, each different view pixel may have an associated direction (e.g., light beam principal angular direction) that corresponds to a different one of the view directions, for example, corresponding to the 64 different views, or corresponding to the 32 different views, in the above examples. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

Herein, an 'angle-preserving scattering feature' or equivalently an 'angle-preserving scattering feature' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = a \cdot \sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
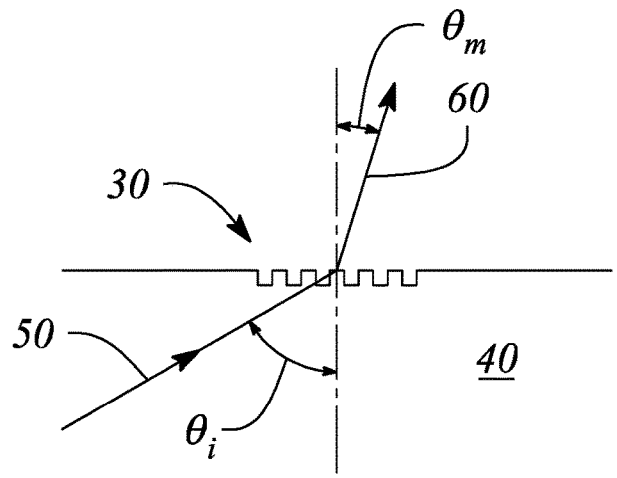
FIG. 2 illustrates a cross sectional view of a diffraction grating in an example, according to an embodiment consistent with the principles described herein.

FIG. 2 illustrates a cross sectional view of a diffraction grating 30 in an example, according to an embodiment consistent with the principles described herein. For example, the diffraction grating 30 may be located on a surface of a light guide 40. In addition, FIG. 2 illustrates a light beam 50 incident on the diffraction grating 30 at an incident angle $\theta_i$. The light beam 50 is a guided light beam within the light guide 40. Also illustrated in FIG. 2 is a directional light beam 60 diffractively produced and coupled-out by the diffraction grating 30 as a result of diffraction of the incident light beam 50. The directional light beam 60 has a diffraction angle $\theta_m$ (or 'principal angular direction' herein) as given by equation (1). The diffraction angle $\theta_m$ may correspond to a diffraction order 'm' of the diffraction grating 30, for example.

By definition herein, a 'multibeam element' is a structure or element of a backlight or a display that produces light that includes a plurality of light beams. In some embodiments, the multibeam element may be optically coupled to a light guide of a backlight to provide the plurality of light beams by coupling out a portion of light guided in the light guide. In other embodiments, the multibeam element may generate light emitted as the light beams (e.g., may comprise a light source). Further, the light beams of the plurality of light beams produced by a multibeam element have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field.

According to various embodiments, the different principal angular directions of the various light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a light beam produced by the multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'an angle-preserving scattering feature' means one or more angle-preserving scattering features and as such, 'the angle-preserving scattering feature' means 'the angle-preserving scattering feature(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
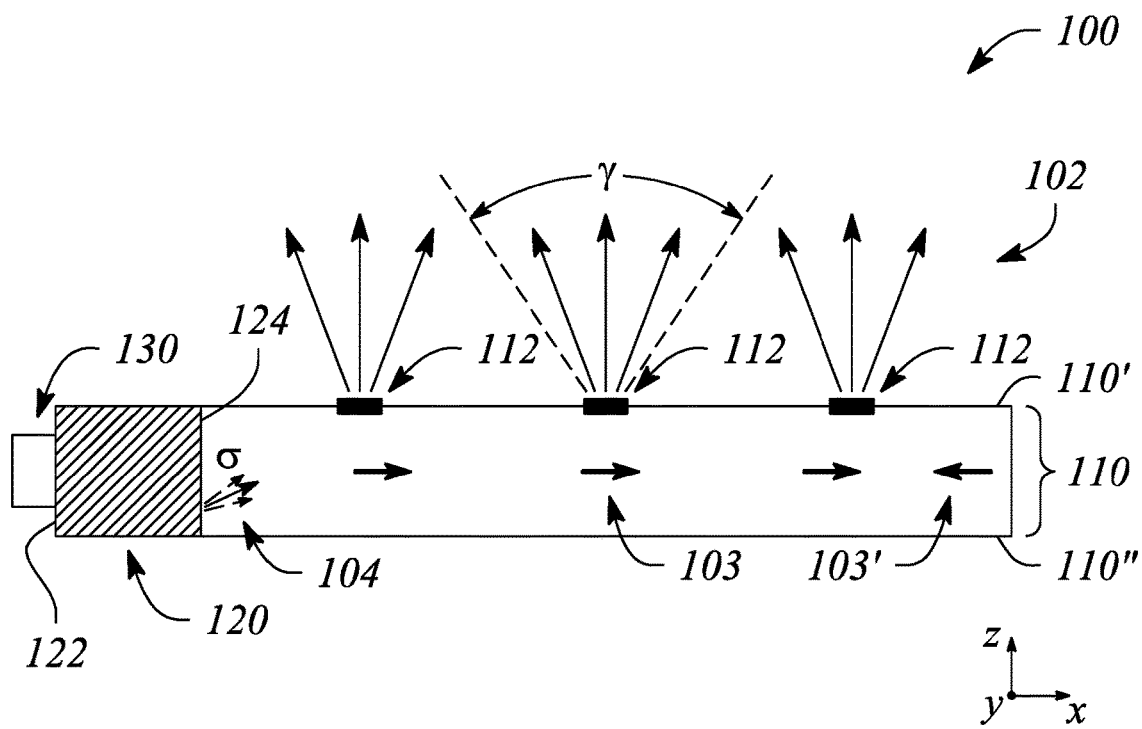
FIG. 3A illustrates a cross sectional view of a backlight in an example, according to an embodiment consistent with the principles described herein.
Figure 3B:
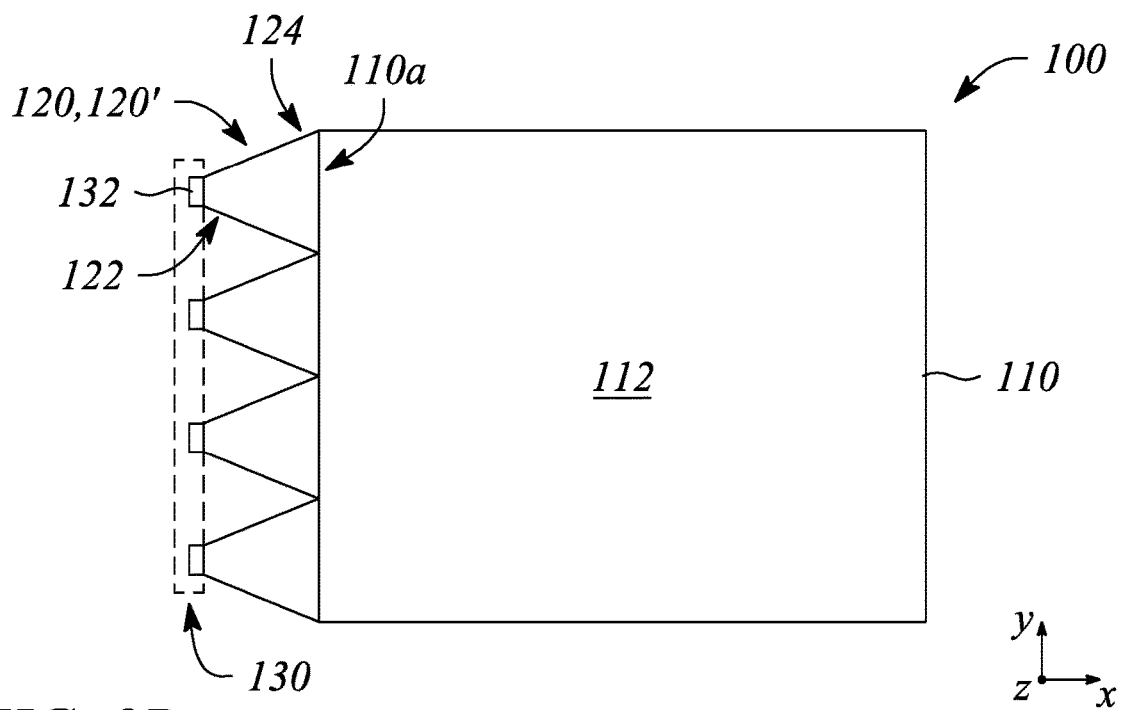
FIG. 3B illustrates a plan view of a backlight in an example, according to an embodiment consistent with the principles described herein.
Figure 3C:
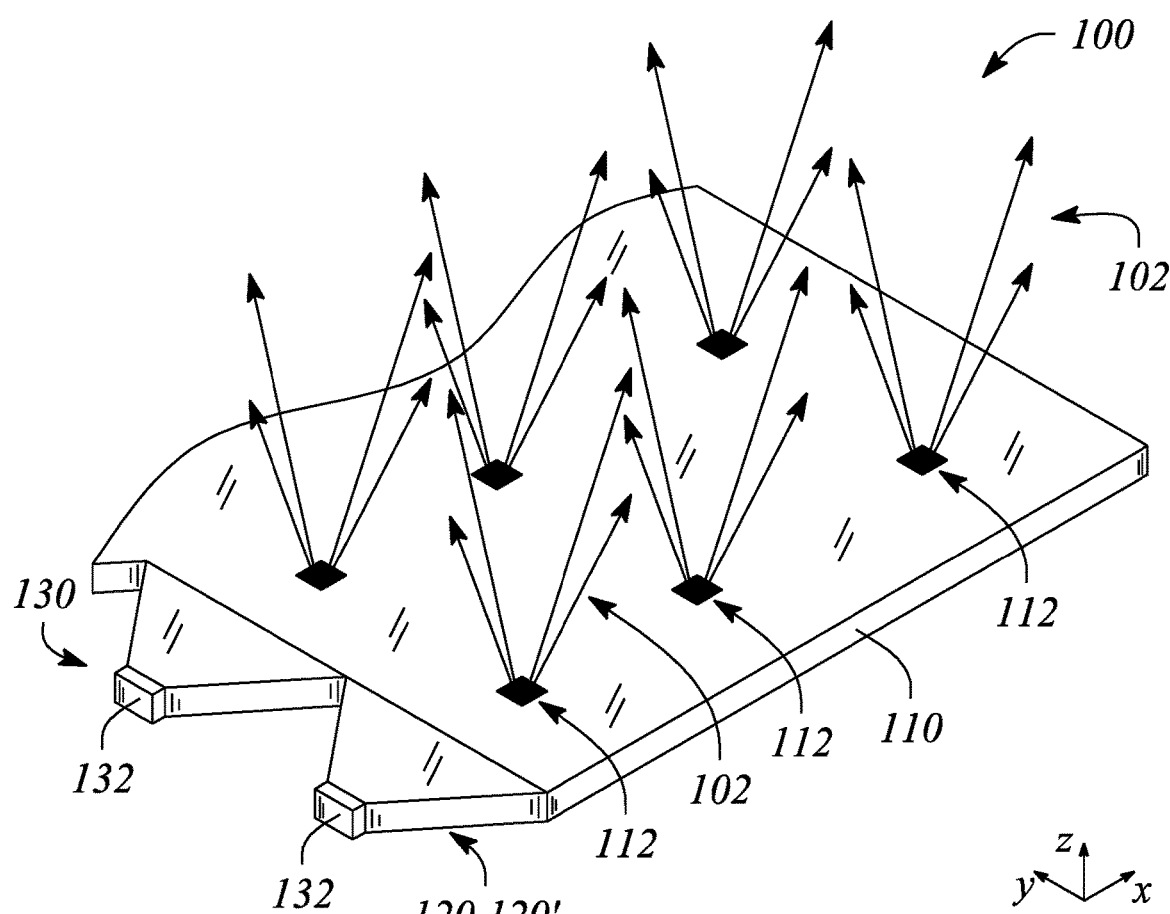
FIG. 3C illustrates a perspective view of a backlight in an example, according to an embodiment consistent with the principles described herein.

According to some embodiments of the principles described herein, a backlight is provided. FIG. 3A illustrates a cross sectional view of a backlight 100 in an example, according to an embodiment consistent with the principles described herein. FIG. 3B illustrates a plan view of a backlight 100 in an example, according to an embodiment consistent with the principles described herein. FIG. 3C illustrates a perspective view of a backlight 100 in an example, according to an embodiment consistent with the principles described herein. The illustrated backlight 100 may be used backlighting in an electronic display including, but not limited to, a multiview display, for example.

The backlight 100 illustrated in FIGS. 3A-3C is configured to provide coupled-out or emitted light 102. The emitted light 102 is directed away from a surface of the backlight 100, as illustrated in FIG. 3A. The emitted light 102 may be employed to illuminate or serve as an illumination source for an electronic display. In particular, the emitted light 102 may be modulated to facilitate the display of information (e.g., images) by the electronic display, for example. In some embodiments, the emitted light 102 may be modulated (e.g., using light valves, as described below) to facilitate the display of information having 3D content or being represented as a multiview image.

In some embodiments (e.g., as described below with respect to a multiview backlight), the emitted light 102 may comprises a plurality of directional light beams in which different ones of the directional light beams have different principal angular directions from one another. For example, the plurality of light beams may represent a light field. Further, the directional light beams have a predetermined angular spread. That is, the principal angular directions of the light beams of the emitted light 102 may be constrained to be substantially within a predetermined subtended angle γ. For example, the predetermined subtended angle γ (or equivalently the angular spread γ) may be defined the with respect to a central light beam of the directional light beam plurality. Further, according to some embodiments, the provided plurality of directional light beams of the emitted light 102 may be directed away from the backlight 100 in different principal angular directions corresponding to respective view directions of a multiview display, e.g., a multiview display that may be used to display a 3D or multiview image. As such, the backlight 100 may be a multiview backlight, as described further below.

As illustrated in FIG. 3A-3C, the backlight 100 comprises a light guide 110. The light guide 110 may be a plate light guide, according to some embodiments. The light guide 110 is configured to guide light along a length of the light guide 110 as guided light 104. For example, the light guide 110 may include a dielectric material configured as an optical waveguide. The dielectric material of the optical waveguide may have a first refractive index that is greater than a second refractive index of a medium surrounding the dielectric optical waveguide. The difference in refractive indices is configured to facilitate total internal reflection of the guided light 104 according to one or more guided modes of the light guide 110. In FIG. 3A, a propagation direction 103 of the guided light 104 is indicated by bold arrows.

In some embodiments, the dielectric optical waveguide of the light guide 110 may be a slab or plate optical waveguide comprising an extended, substantially planar sheet of optically transparent, dielectric material. According to various examples, the optically transparent, dielectric material of the light guide 110 may include or be made up of any of a variety of dielectric materials including, but not limited to, one or more of various types of glass (e.g., silica glass, alkali-aluminosilicate glass, borosilicate glass, etc.), one or more substantially optically transparent plastics or polymers (e.g., poly(methyl methacrylate) or 'acrylic glass', polycarbonate, etc.) or a combination thereof. In some embodiments, the light guide 110 may further include a cladding layer (not illustrated) on at least a portion of a surface (e.g., one or both of a top surface and a bottom surface) of the light guide 110. The cladding layer may be used to further facilitate total internal reflection, according to some examples.

According to some embodiments, the light guide 110 is configured to guide the guided light 104 according to total internal reflection at a non-zero propagation angle between a first surface 110' (e.g., 'front' surface or side) and a second surface 110" (e.g., 'back' surface or side) of the light guide 110. In particular, the guided light 104 may propagate by reflecting or 'bouncing' between the first surface 110' and the second surface 110" of the light guide 110 at the non-zero propagation angle (albeit in the propagation direction 103 indicated by the bold arrows). In some embodiments, a plurality of guided light beams comprising different colors of light may be guided by the light guide 110 at respective ones of different color-specific, non-zero propagation angles. The non-zero propagation angle is not illustrated in FIGS. 3A-3C for simplicity of illustration.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided light 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110. Further, the guided light 104 or equivalently the guided light 'beam' 104 may be a collimated light beam (e.g., provide by a tapered collimator, described below), according to various embodiments. Herein, a 'collimated light' or 'collimated light beam' is generally defined as a beam of light in which rays of the light beam are substantially confined to a predetermined or defined angular spread within the light beam (e.g., the guided light 104). Further, rays of light that diverge or are scattered from the collimated light beam are not considered to be part of the collimated light beam, by definition herein. Moreover, the guided light 104 may be collimated according to or having a collimation factor, in various embodiments.

In some embodiments, the light guide 110 may be configured to 'recycle' the guided light 104. In particular, the guided light 104 that has been guided along the light guide length may be redirected back along that length in another propagation direction 103' that differs from (e.g., is opposite to) the propagation direction 103. For example, the light guide 110 may include a reflector (not illustrated) at an end of the light guide 110 opposite to an input end or entrance edge adjacent to the light source. The reflector may be configured to reflect the guided light 104 back toward the entrance edge as recycled guided light. In FIG. 3A, a bold arrow indicating a propagation direction 103' of recycled guided light (e.g., directed in a negative x-direction) illustrates a general propagation direction of the recycled guided light within the light guide 110. Alternatively (e.g., as opposed to recycling guided light), guided light 104 propagating in the other propagation direction 103' may be provided by introducing light into the light guide 110 with the other propagation direction 103' (e.g., in addition to guided light 104 having the propagation direction 103). Recycling guided light 104 or alternatively providing guided light 104 in the other propagation direction 103' may increase a brightness of the backlight 100 (e.g., an intensity of the directional light beams of the emitted light 102) by making guided light available to be scattered out of the backlight 100 more than once, for example, e.g., by angle-preserving scatterers described below.

According to various embodiments, the light guide 110 has an angle-preserving scattering feature 112. The angle-preserving scattering feature 112 is configured to scatter a portion of the guided light 104 out of the light guide 110 as the emitted light 102. In some embodiments (e.g., as illustrated), the angle-preserving scattering feature 112 comprises a plurality of angle-preserving scatterers. In particular, individual angle-preserving scatterers of the angle-preserving feature 112 may be discrete structures or features that are spaced apart from one another, each discrete structure being configured to scatter or couple-out a different portion of the guided light 104 in an angle-preserving manner. In various embodiments, the angle-preserving scattering feature 112 may comprise any of variety of different structures or features that provide or are configured to produce angle-preserving scattering including, but not limited to, a diffraction grating, a reflective structure and a refractive structure as well as various combinations thereof.

Further, according to various embodiments, an angular spread of the emitted light 102 or equivalently of the directional light beams of the emitted light 102 is determined by a characteristic of the angle-preserving scattering feature 112. In particular, the angle-preserving scattering feature 112 is configured to scatter a portion of the guided light 104 out of the light guide 110 as the emitted light 102 having the angular spread characterized by a predetermined subtended angle γ. As a result, the emitted light 102 may be substantially confined within the predetermined subtended angle γ (or equivalently within the angular spread) as a result of the scattering by the angle-preserving scattering feature 112. Moreover, the angular spread of the emitted light 102 is a function of, and in some embodiments is proportional to, the collimation factor of the guided light 104. For example, the predetermined subtended angle γ of the angular spread (or equivalently the 'angular spread') may be given by equation (2) as $$\gamma = f(\sigma) \qquad (2)$$

where σ is the collimation factor of the guided light 104 and $f(\cdot)$ represents a function such as, but not limited to, a linear function of the collimation factor σ. For example, the function $f(\cdot)$ may be given as γ=a·σ, where a is an integer.

As illustrated in FIGS. 3A-3C, the backlight 100 further comprises a tapered collimator 120. According to various embodiments (e.g., as illustrated), the tapered collimator 120 may be located between the light guide 110 (e.g., an entrance surface of the light guide 110) and a light source. The tapered collimator 120 is configured to collimate light provided by the light source as collimated light. That is, the tapered collimator 120 is configured to receive light from the light source and then to collimate the received light to produce the collimated light. Further, the tapered collimator 120 is configured to communicate or transmit the collimated light to the light guide 110 to be guided as the guided light 104.

In various embodiments, the collimated light has or is collimated according to a collimation factor σ. The collimation factor σ is configured to provide a predetermined angular spread of the guided light 104. Moreover, the collimation factor σ is a function of a taper of the tapered collimator 120 (e.g., a sidewall taper described below), according to various embodiments. In particular, one or both of an angle and a shape of the taper determines the collimation factor σ. In some embodiments, the collimated light provided by the tapered collimator 120 may facilitate or provide substantially uniform spatio-angular illumination of the light guide 110 (e.g., at an entrance surface).

The tapered collimator 120 illustrated in FIGS. 3A-3C comprises a light guide having a sidewall taper such that an input end 122 of the tapered collimator 120 is generally narrower than an output end 124 of the tapered collimator 120. In particular, a width dimension of the tapered collimator 120 increases or 'tapers' from the input end 122 to the output end 124 as a result of the sidewall taper. Here, the 'width dimension' or simply 'width' is defined as a dimension in a direction corresponding to a width of the light guide 110. The light guide 'width', in turn, is defined as a dimension along or corresponding to a y-axis, as illustrated in FIGS. 3A-3C, which is in a plane that is substantially orthogonal to the general propagation direction the guided light 104. The width of the light guide 110 is also substantially perpendicular to a height or thickness of the light guide 110, e.g., a dimension along or corresponding to a z-axis illustrated in FIGS. 3A-3C.

According to various embodiments, the input end 122 of the tapered collimator 120 is adjacent to and configured to receive light from the light source, e.g., the light source 130, as illustrated. The light source may be configured to provide substantially uncollimated light, for example. The output end 124 of the tapered collimator 120 is adjacent to and configured to provide the collimated light to the light guide 110 of the backlight 100. As illustrated, collimated light from the tapered collimator 120 is provided at an input or entrance edge 110a of the light guide 110.

Further, according to some embodiments, the sidewall taper of the light guide 110 of the tapered collimator 120 may be configured to not only collimate light but also to provide uniform spatio-angular illumination of the light guide 110 by the collimated light, as mentioned above. In particular, the uniform spatio-angular illumination may be provided in a portion of the light guide 110 corresponding to the width or extent of the output end 124 of the tapered collimator 120 adjacent to the entrance edge 110a.

In some embodiments (e.g., as illustrated in FIGS. 3A-3C), tapered collimator 120 of the backlight 100 may comprise a plurality of tapered collimator segments 120', e.g., a plurality of separate tapered collimators 120. For example, plurality of tapered collimator segments 120' of the tapered collimator 120 may be arranged along a width of the light guide 110 the entrance edge 110a, as illustrated. Further, a tapered collimation segment 120' may have a width or sidewall taper in a plane of the light guide corresponding to the light guide width, the sidewall taper providing an increase in a width of the tapered collimation segment 120' as a function of distance from a light source adjacent end (the input end 122) of the tapered collimation segment 120' to an opposite end adjacent to the light guide 110 (the output end 124). Each tapered collimator segment 120' of the tapered collimator 120 may be configured to provide substantially uniform spatio-angular illumination to a portion of the entrance edge 110a of the light guide 110 corresponding respectively to the individual tapered collimator segment 120'. Further, the tapered collimator segments 120' of the tapered collimator 120 may be located or arranged immediately adjacent to one another to provide substantially uniform spatio-angular illumination to a full width of light guide 110 at or along the entrance edge 110a, in some embodiments.

In some embodiments, the tapered collimator 120 may further comprise surface structuring or surface micro-structuring at or adjacent to the input end 122. In some embodiments, the surface structuring may one or both of facilitate coupling of light into the input end 122 of the tapered collimator 120 and be configured to provide or at least contribute to (e.g., along with a taper of the tapered collimator 120) the substantially uniform spatio-angular illumination of the light guide 110. For example, the surface structuring may be configured to increase a divergence of light entering the input end 122 (e.g., from a light source). In turn, the increased divergence of the light may result in an increase in an interaction between the light and the sidewall taper. In particular, the increased divergence may be substantially in a plane corresponding to width dimension. In some examples, the resulting increased light interaction with the sidewalls may allow a length of the tapered collimator 120 to be shorter than without the surface structuring. In various embodiments, the surface structuring may either comprise material of the tapered collimator 120 (e.g., be formed into the input end 122) or may comprise a film or layer at the input end 122 that is configured to provide the surface structuring. Any of a variety of surface structuring may be employed including, but not limited to, prismatic surface structuring (i.e., an array of prismatic structures), a array of lenslets (e.g., positive or convex lenslets, negative or concave lenslets, etc.), and diffraction gratings.

Figure 4A:
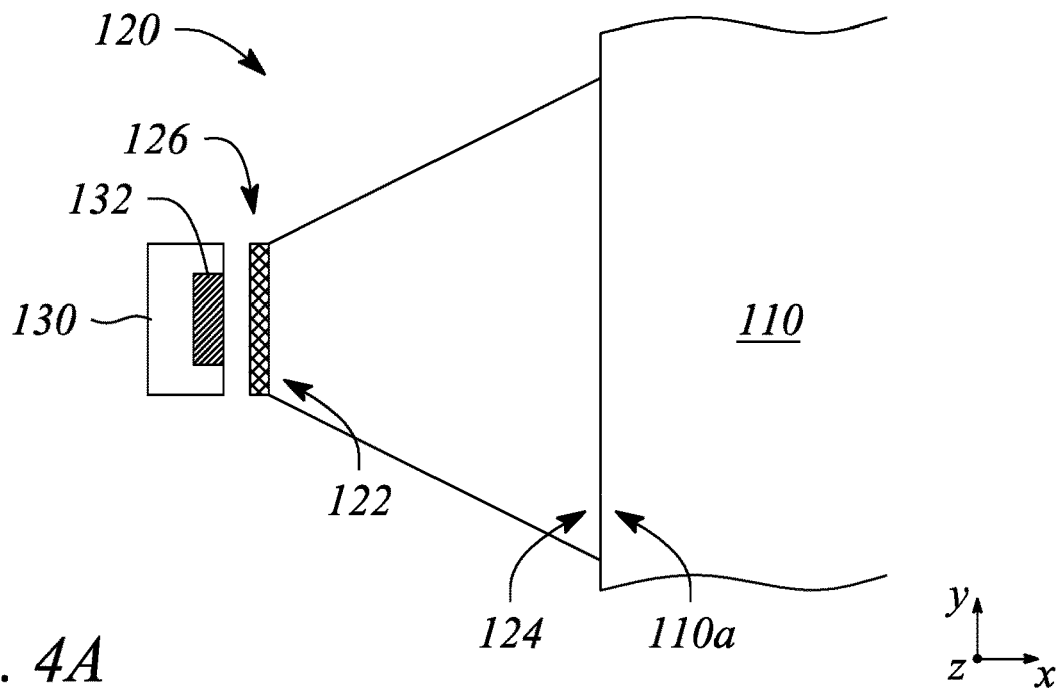
FIG. 4A illustrates a plan view of a tapered collimator in an example, according to an embodiment consistent with the principles described herein.

FIG. 4A illustrates a plan view of a tapered collimator 120 in an example, according to an embodiment consistent with the principles described herein. As illustrated, the tapered collimator 120 includes an input end 122 adjacent to a light source 130 having an optical emitter 132 (e.g., a light emitting diode). The tapered collimator 120 in FIG. 4A also has an output end 124 adjacent to an entrance edge 110a of a light guide 110. The tapered collimator 120 comprises a sidewall taper that increases the tapered collimator width (i.e., y-direction) from the input end 122 to the output end 124. Also illustrated is surface structuring 126 at the input end 122 and adjacent to the light source 130.

Figure 4B:
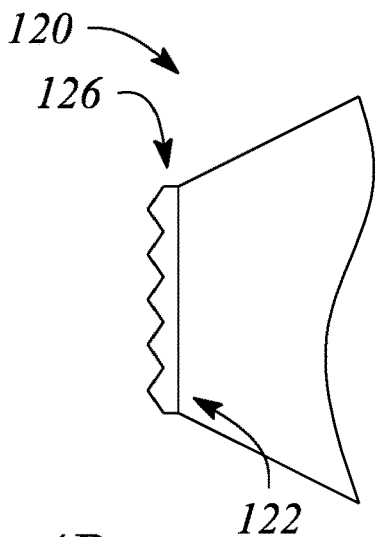
FIG. 4B illustrates a plan view of a portion of a tapered collimator in an example, according to an embodiment consistent with the principles described herein.

FIG. 4B illustrates a plan view of a portion of a tapered collimator 120 in an example, according to an embodiment consistent with the principles described herein. In particular, FIG. 4B illustrates an example of surface structuring 126 comprising a prismatic array (i.e., prismatic surface structuring). The prismatic array of the surface structuring 126 may be configured to provide divergence of the light entering tapered collimator 120. For example, a prism or facet angle of the prismatic surface structuring 126 illustrate in FIG. 4B may be between about ten degrees (10°) and about thirty degrees (30°) to provide light divergence.

Figure 4C:
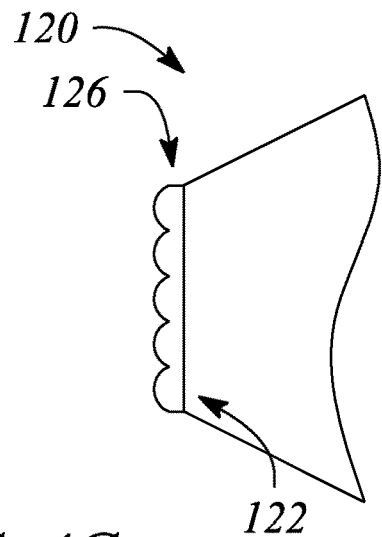
FIG. 4C illustrates a plan view of a portion of a tapered collimator in another example, according to an embodiment consistent with the principles described herein.

FIG. 4C illustrates a plan view of a portion of a tapered collimator in another example, according to an embodiment consistent with the principles described herein. In particular, FIG. 4C illustrates surface structuring 126 comprising an array of lenslets (e.g., positive lenslets). In both FIGS. 4B and 4C, the surface structuring 126 either may comprise either a material of the tapered collimator 120 or may comprise a layer or film at or adjacent to (e.g., applied to) the input end to the collimator 120.

According to some embodiments, the tapered collimator 120 may be further tapered in thickness or in a height dimension that is substantially perpendicular to the width dimension corresponding to the sidewall taper. As such, the tapered collimator 120 may further comprise a thickness taper. For example, a tapered collimator 120 or equivalently a tapered collimation segment 120' may comprises a thickness taper in a direction orthogonal to the sidewall taper, the thickness taper providing a change in a thickness of the tapered collimator 120 or tapered collimation segment 120' as a function of distance from the light source adjacent end (the input end 122) to the light guide adjacent end (the output end 124) of the tapered collimation segment 120'.

Figure 5:
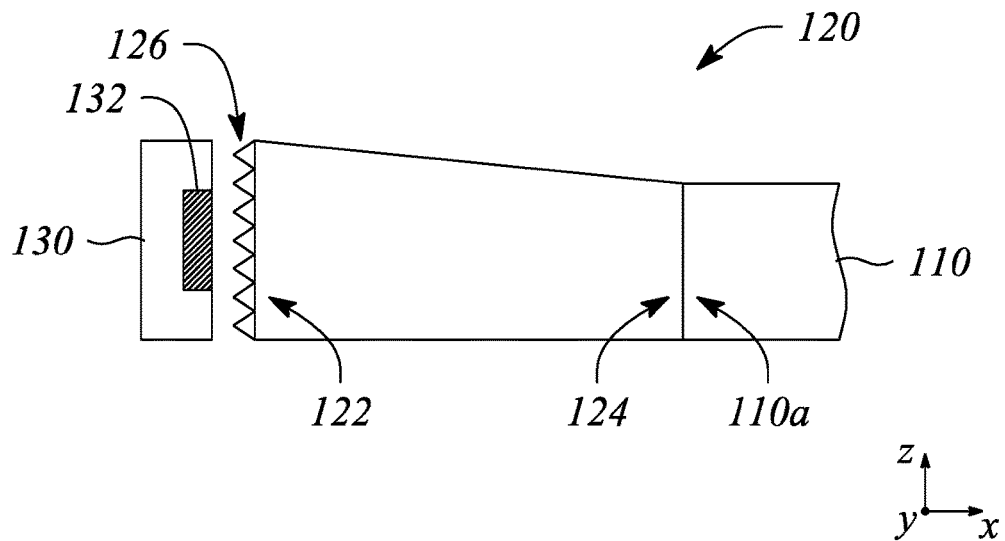
FIG. 5 illustrates a cross sectional view of a tapered collimator in an example, according to an embodiment consistent with the principles described herein.

According to some embodiments (e.g., as illustrated in FIG. 5), the thickness taper is characterized by a height or thickness of the tapered collimator light guide that generally decreases as a function of distance from the input end 122 to the output end 124 of the tapered collimator 120. In other embodiments (not illustrated), the thickness taper is characterized by a height or thickness that generally increases as a function of distance from the input end 122 to the output end 124. According to various embodiments, the thickness taper as well as the surface structuring 126, if present, may be configured to one or both of improve alignment tolerance of an optical emitter of the light source 130 and modify light momentum in a longitudinal or x-direction.

For example, the thickness taper that decreases as a function of distance may facilitate spreading light from the light source 130 more evenly across the output end 124 of the tapered collimator 120. In particular, the thickness taper that decreases may increase an angular spread or collimation factor in a height or vertical direction (e.g., in the z-direction) of light passing therethrough. On the other hand, a thickness taper that increases as a function of distance may be employed to decrease the angular spread or collimation factor in the vertical direction, i.e., provide better vertical collimation. Similarly, characteristics of the surface structuring 126 may be used to adjust the collimation factor, improve alignment tolerance, increase or decrease interaction with sloped surfaces of the tapered collimator 120, etc.

FIG. 5 illustrates a cross sectional view of a tapered collimator 120 in an example, according to an embodiment consistent with the principles described herein. Equivalently, the taper collimator 120 illustrated in FIG. 5 may also represent a cross sectional view of a tapered collimator segment, e.g., the tapered collimator segment 120'. As illustrated in FIG. 5, the tapered collimator 120 has a thickness taper that decreases as a function of distance from the light source adjacent end (the input end 122) to the light guide adjacent end (the output end 124), i.e., it decreases in a dimension corresponding to the a vertical or z-axis. The tapered collimator 120 illustrated in FIG. 5 also includes surface structuring 126, by way of example and not limitation. In particular, the illustrated surface structuring 126 in FIG. 5 comprises a prismatic array aligned parallel to the y-axis.

Note that the surface structuring 126 may be employed either with or without the thickness taper illustrated in FIG. 5. FIG. 5 further illustrates a light source 130 having an optical emitter 132 (e.g., a light emitting diode) located at the light source adjacent end or input end 122 of the tapered collimator 120 and opposite the light guide adjacent end or output end 124. A portion of the light guide 110 including the entrance edge 110a is also illustrated in FIG. 5.

In some embodiments, the taper of one or both of the sidewall taper and the thickness taper may be a substantially straight or linear taper, i.e., the taper may vary as or be a linear function of distance. In other examples, one or both of the sidewall taper and the thickness taper may be curved or comprise a curved shape. For example, the sidewall taper may have a curved shape characterized by, but not limited to, a parabolic curve or a shaped parabolic curve. For ease of illustration, FIGS. 4A-4C and FIG. 5 illustrate linear tapers by way of example and not limitation.

Referring again to FIG. 3A-3C, the angle-preserving scattering feature 112 of the light guide 110 in the backlight 100 may comprise a multibeam element, according to some embodiments. In particular, the angle-preserving scattering feature 112 illustrated in FIGS. 3A-3C may comprise a plurality of multibeam elements. The backlight 100 with a light guide 110 having an angle-preserving scattering feature 112 comprising a multibeam element may be referred to as a 'multibeam' backlight, as is further described in more detail below.

Figure 6A:
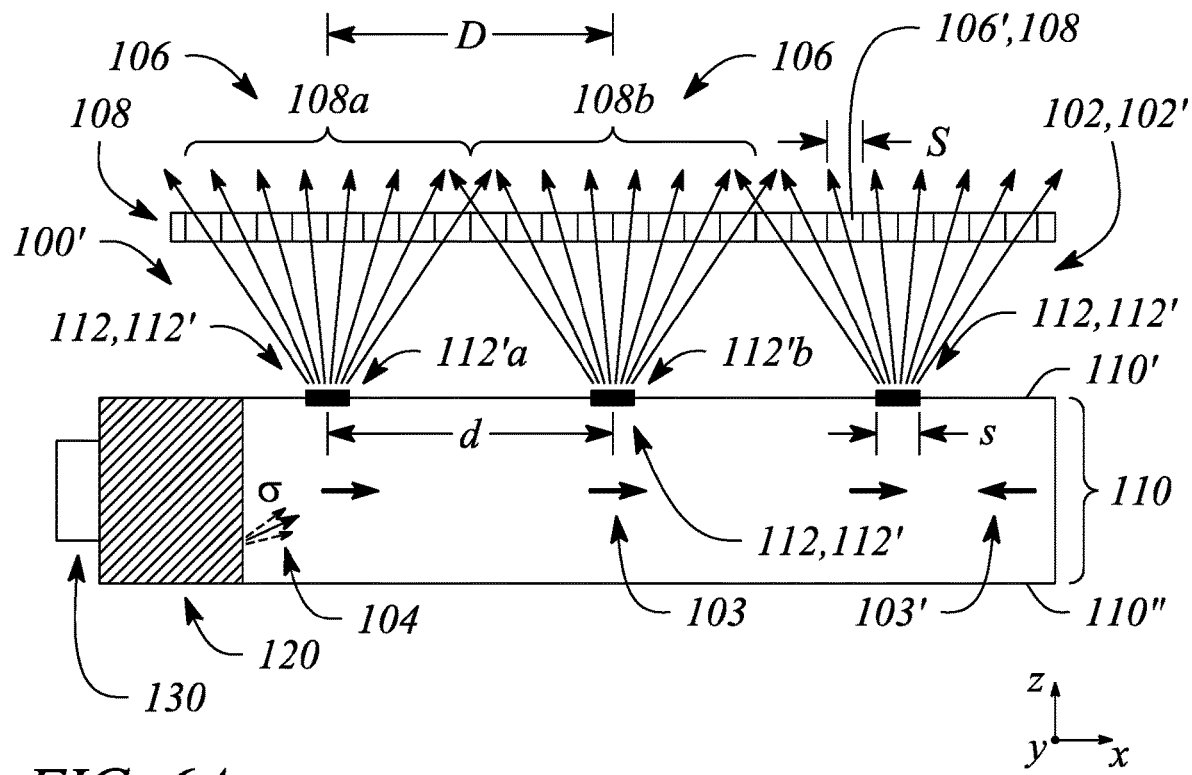
FIG. 6A illustrates a cross sectional view of a multiview backlight in an example, according to an embodiment consistent with the principles described herein.
Figure 6B:
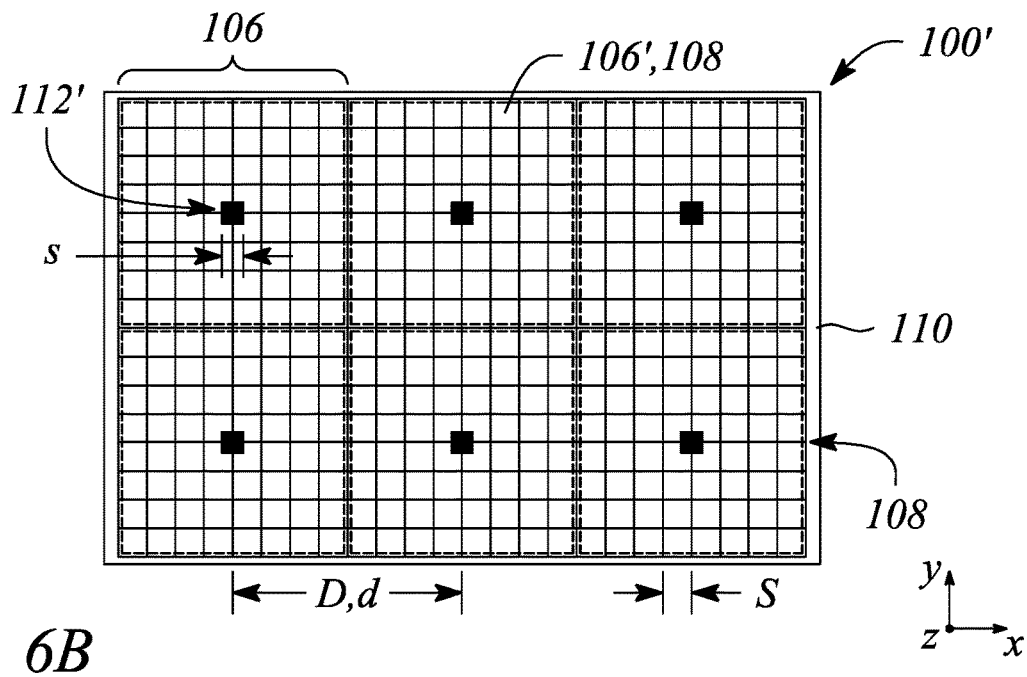
FIG. 6B illustrates a plan view of a multiview backlight in an example, according to an embodiment consistent with the principles described herein.
Figure 6C:
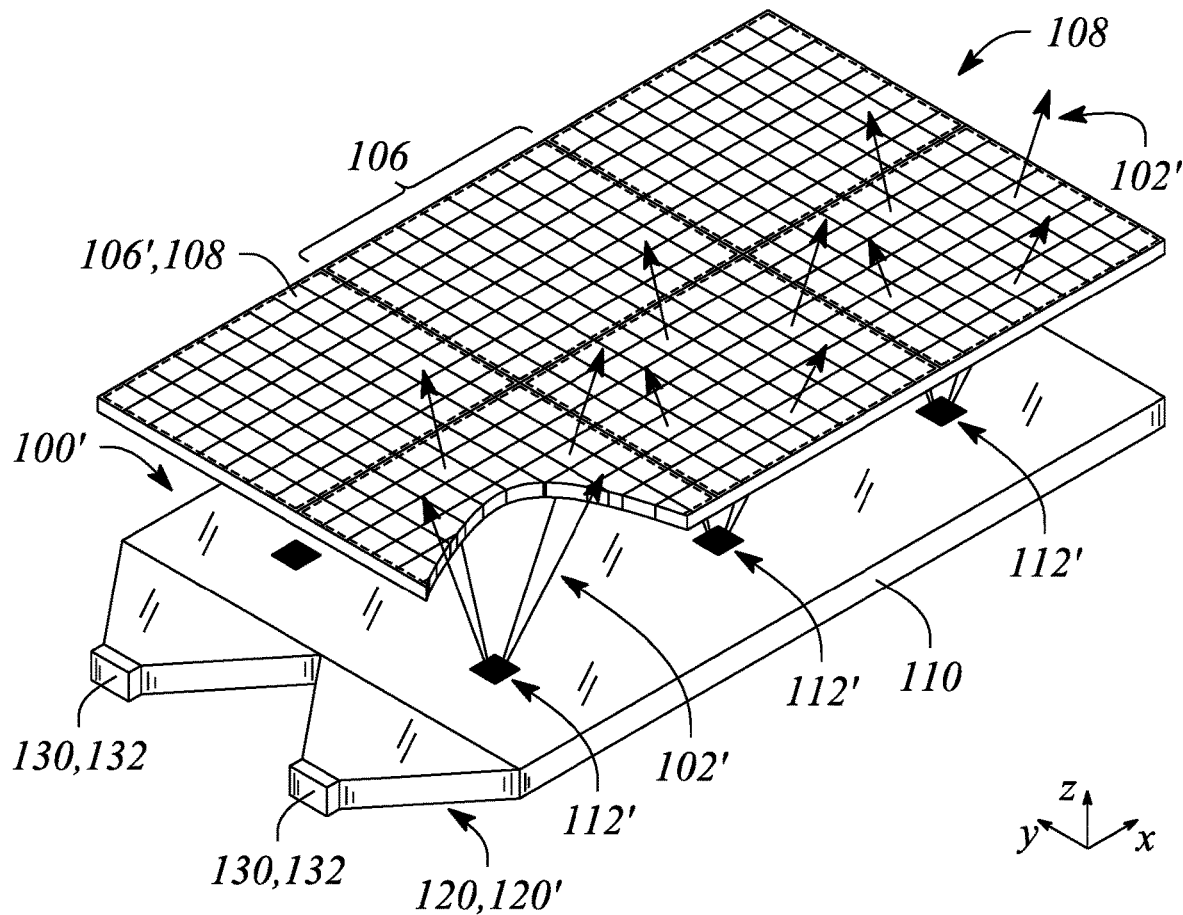
FIG. 6C illustrates a perspective view of a multiview backlight of in an example, according to an embodiment consistent with the principles described herein.

FIG. 6A illustrates a cross sectional view of a multibeam backlight 100' in an example, according to an embodiment consistent with the principles described herein. FIG. 6B illustrates a plan view of a multiview backlight 100' in an example, according to an embodiment consistent with the principles described herein. FIG. 6C illustrates a perspective view of a multiview backlight 100' in an example, according to an embodiment consistent with the principles described herein. As illustrated, the multibeam backlight 100' comprises the light guide 110 having the angle-preserving scattering feature 112 and the tapered collimator 120 (not illustrated in FIG. 6B). Further, the angle-preserving scattering feature 112 illustrated in FIGS. 6A-6C comprises a plurality of multibeam elements 112'.

According to various embodiments, multibeam elements 112' of the multibeam element plurality may be spaced apart from one another along a length of the light guide 110. In particular, the multibeam elements 112' may be separated from one another by a finite space and represent individual, distinct elements along the light guide length. Further the multibeam elements 112' generally do not intersect, overlap or otherwise touch one another, according to some embodiments. That is, each multibeam element 112' of the multibeam element plurality is generally distinct and separated from other ones of the multibeam elements 112'.

According to some embodiments, the plurality of multibeam elements 112' of the angle-preserving scattering feature 112 may be arranged in either a one-dimensional (1D) array or two-dimensional (2D) array. For example, the plurality of multibeam elements 112' may be arranged as a linear 1D array. In another example, the plurality of multibeam elements 112' may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 112' may be substantially uniform or constant across the array. In other examples, the inter-element distance between the multibeam elements 112' may be varied one or both of across the array and along the length of the light guide 110.

According to various embodiments, a multibeam element 112' of the plurality is configured to couple out a portion of the guided light 104 as the emitted light 102. Further, the emitted light 102 comprises a plurality of directional light beams 102'. In FIGS. 6A and 6C, the directional light beams 102' are illustrated as a plurality of diverging arrows depicted as being directed way from the first (or front) surface 110' of the light guide 110. According to various embodiments, the directional light beams 102' have different principal angular directions from one another. Further, the different principal angular directions of the directional light beams 102' correspond to respective different view directions of a multiview display comprising multiview pixels, according to various embodiments.

In addition, a size of the multibeam element 112' may be comparable to a size of a view pixel 106' in a multiview pixel 106 of the multiview display, according to some embodiments. Herein, the 'size' may be defined in any of a variety of manners to include, but not be limited to, a length, a width or an area. For example, the size of a view pixel 106' may be a length thereof and the comparable size of the multibeam element 112' may also be a length of the multibeam element 112'. In another example, size may refer to an area such that an area of the multibeam element 112' may be comparable to an area of the view pixel 106'.

In some embodiments, the size of the multibeam element 112' is comparable to the view pixel size such that the multibeam element size is between about fifty percent (50%) and about two hundred percent (200%) of the view pixel size. In other examples, the multibeam element size is greater than about sixty percent (60%) of the view pixel size, or about seventy percent (70%) of the view pixel size, or greater than about eighty percent (80%) of the view pixel size, or greater than about ninety percent (90%) of the view pixel size, and the multibeam element 112' is less than about one hundred eighty percent (180%) of the view pixel size, or less than about one hundred sixty percent (160%) of the view pixel size, or less than about one hundred forty (140%) of the view pixel size, or less than about one hundred twenty percent (120%) of the view pixel size. For example, by 'comparable size', the multibeam element size may be between about seventy-five percent (75%) and about one hundred fifty (150%) of the view pixel size. In another example, the multibeam element 112' may be comparable in size to the view pixel 106' where the multibeam element size is between about one hundred twenty-five percent (125%) and about eighty-five percent (85%) of the view pixel size. According to some embodiments, the comparable sizes of the multibeam element 112' and the view pixel 106' may be chosen to reduce, or in some examples to minimize, dark zones between views of the multiview display, while at the same time reducing, or in some examples minimizing, an overlap between views of the multiview display. FIGS. 6A-6C also illustrate multiview pixels 106 along with the multiview backlight 100 for the purpose of facilitating discussion. In FIGS. 6A-6B, the multibeam element size is denoted 's' and the view pixel size is denoted 'S'.

FIGS. 6A-6C further illustrate an array of light valves 108 configured to modulate the directional light beams 102' of the directional light beam plurality within the emitted light 102. The light valve array may be part of a multiview display that employs the multiview backlight, for example, and is illustrated in FIGS. 6A-6C along with the multiview backlight 100' for the purpose of facilitating discussion herein. In FIG. 6C, the array of light valves 108 is partially cut-away to allow visualization of the light guide 110 and the multibeam element 112' underlying the light valve array. In various embodiments, different types of light valves may be employed as the light valves 108 of the light valve array including, but not limited to, one or more of liquid crystal light valves, electrophoretic light valves, and light valves based on electrowetting.

As illustrated in FIGS. 6A-6C, different ones of the directional light beams 102' pass through and may be modulated by different ones of the light valves 108 in the light valve array. Further, as illustrated, a light valve 108 of the array corresponds to a view pixel 106', and a set of the light valves 108 corresponds to a multiview pixel 106 of a multiview display. In particular, a different set of light valves 108 of the light valve array is configured to receive and modulate the directional light beams 102' from different ones of the multibeam elements 112', i.e., there is one unique set of light valves 108 for each multibeam element 112', as illustrated.

As illustrated in FIG. 6A, a first light valve set 108a is configured to receive and modulate the directional light beams 102' from a first multibeam element 112'a, while a second light valve set 108b is configured to receive and modulate the directional light beams 102' from a second multibeam element 112'b. Thus, each of the light valve sets (e.g., the first and second light valve sets 108a, 108b) in the light valve array corresponds, respectively, to a different multiview pixel 106, with individual light valves 108 of the light valve sets corresponding to the view pixels 106' of the respective multiview pixels 106, as illustrated in FIG. 6A.

Note that, as illustrated, the size of a view pixel 106' may correspond to a size of a light valve 108 in the light valve array. In other examples, the view pixel size may be defined as a distance (e.g., a center-to-center distance) between adjacent light valves 108 of the light valve array. For example, the light valves 108 may be smaller than the center-to-center distance between the light valves 108 in the light valve array. The view pixel size may be defined as either the size of the light valve 108 or a size corresponding to the center-to-center distance between the light valves 108, for example.

In some embodiments, a relationship between the multibeam elements 112' of the plurality and corresponding multiview pixels 106 (e.g., sets of light valves 108) may be a one-to-one relationship. That is, there may be an equal number of multiview pixels 106 and multibeam elements 112'. FIG. 6B explicitly illustrates by way of example the one-to-one relationship where each multiview pixel 106 comprising a different set of light valves 108 is illustrated as surrounded by a dashed line. In other embodiments (not illustrated), the number of multiview pixels 106 and multibeam elements 112' may differ from one another.

In some embodiments, an inter-element distance (e.g., center-to-center distance) between a pair of adjacent multibeam elements 112' of the plurality may be equal to an inter-pixel distance (e.g., a center-to-center distance) between a corresponding adjacent pair of multiview pixels 106, e.g., represented by light valve sets. For example, as illustrated in FIG. 6A, a center-to-center distance d between the first multibeam element 112'a and the second multibeam element 112'b is substantially equal to a center-to-center distance D between the first light valve set 108a and the second light valve set 108b. In other embodiments (not illustrated), the relative center-to-center distances of pairs of multibeam elements 112' and corresponding light valve sets may differ, e.g., the multibeam elements 112' may have an inter-element spacing (i.e., center-to-center distance d) that is one of greater than or less than a spacing (i.e., center-to-center distance D) between light valve sets representing multiview pixels 106.

In some embodiments, a shape of the multibeam element 112' is analogous to a shape of the multiview pixel 106 or equivalently, a shape of a set (or 'sub-array') of the light valves 108 corresponding to the multiview pixel 106. For example, the multibeam element 112' may have a square shape and the multiview pixel 106 (or an arrangement of a corresponding set of light valves 108) may be substantially square. In another example, the multibeam element 112' may have a rectangular shape, i.e., may have a length or longitudinal dimension that is greater than a width or transverse dimension. In this example, the multiview pixel 106 (or equivalently the arrangement of the set of light valves 108) corresponding to the multibeam element 112' may have an analogous rectangular shape. FIG. 6B illustrates a top or plan view of square-shaped multibeam elements 112' and corresponding square-shaped multiview pixels 106 comprising square sets of light valves 108. In yet other examples (not illustrated), the multibeam elements 112' and the corresponding multiview pixels 106 have various shapes including or at least approximated by, but not limited to, a triangular shape, a hexagonal shape, and a circular shape.

Further (e.g., as illustrated in FIG. 6A), each multibeam element 112' is configured to provide directional light beams 102' to one and only one multiview pixel 106, according to some embodiments. In particular, for a given one of the multibeam elements 112', the directional light beams 102' having different principal angular directions corresponding to the different views of the multiview display are substantially confined to a single corresponding multiview pixel 106 and the view pixels 106' thereof, i.e., a single set of light valves 108 corresponding to the multibeam element 112', as illustrated in FIG. 6A. As such, each multibeam element 112' of the multiview backlight 100 provides a corresponding set of directional light beams 102' that has a set of the different principal angular directions corresponding to the different views of the multiview display (i.e., the set of directional light beams 102' contains a light beam having a direction corresponding to each of the different view directions).

According to various embodiments, the multibeam elements 112' may comprise any of a number of different structures configured to couple out a portion of the guided light 104. For example, the different structures may include, but are not limited to, diffraction gratings, micro-reflective elements, micro-refractive elements, or various combinations thereof. In some embodiments, the multibeam element 112' comprising a diffraction grating is configured to diffractively couple out the guided light portion as the plurality of directional light beams 102' having the different principal angular directions. In other embodiments, the multibeam element 112' comprising a micro-reflective element is configured to reflectively couple out the guided light portion as the plurality of directional light beams 102', or the multibeam element 112' comprising a micro-refractive element is configured to couple out the guided light portion as the plurality of directional light beams 102' by or using refraction (i.e., refractively couple out the guided light portion).

Figure 7A:
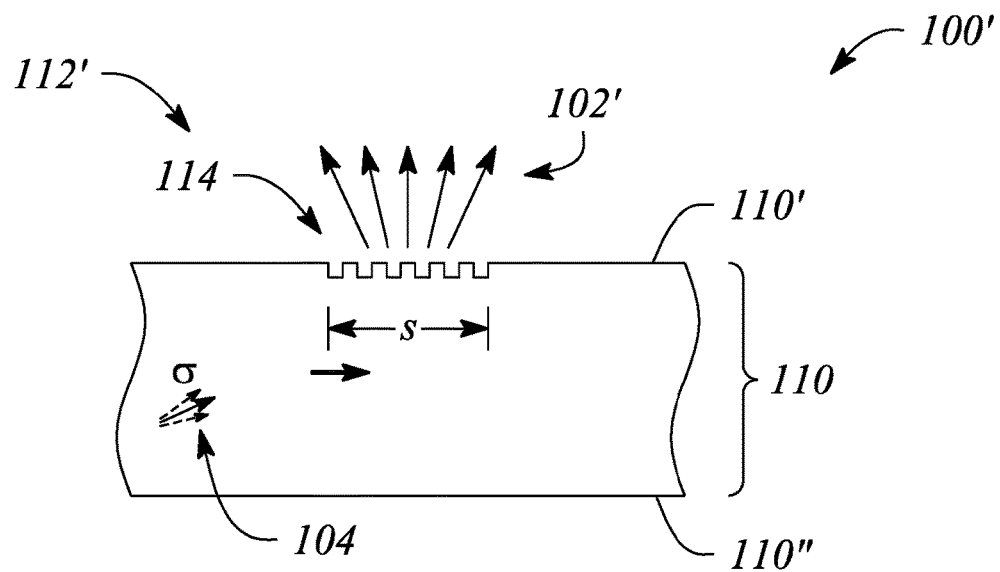
FIG. 7A illustrates a cross sectional view of a portion of a multiview backlight including a multibeam element in an example, according to an embodiment consistent with the principles described herein.
Figure 7B:
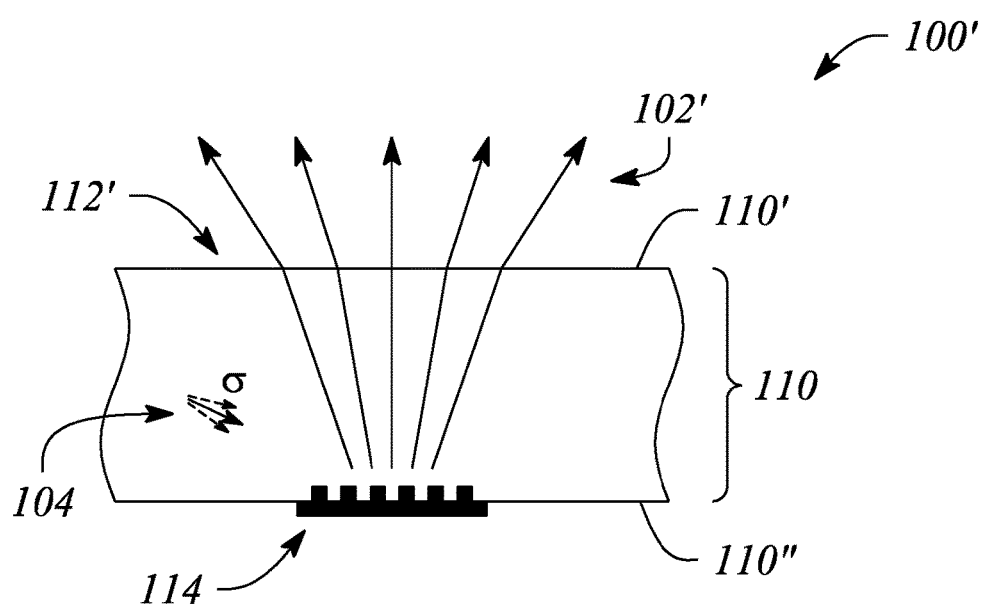
FIG. 7B illustrates a cross sectional view of a portion of a multiview backlight including a multibeam element in an example, according to another embodiment consistent with the principles described herein.

FIG. 7A illustrates a cross sectional view of a portion of a multiview backlight 100' including a multibeam element 112' in an example, according to an embodiment consistent with the principles described herein. FIG. 7B illustrates a cross sectional view of a portion of a multiview backlight 100' including a multibeam element 112' in an example, according to another embodiment consistent with the principles described herein. In particular, FIGS. 7A-7B illustrate the multibeam element 112' of the multiview backlight 100' comprising a diffraction grating 114. The diffraction grating 114 is configured to diffractively couple out a portion of the guided light 104 as the plurality of directional light beams 102' of the emitted light 102. The diffraction grating 114 comprises a plurality of diffractive features spaced apart from one another by a diffractive feature spacing or a diffractive feature or grating pitch configured to provide diffractive coupling out of the guided light portion. According to various embodiments, the spacing or grating pitch of the diffractive features in the diffraction grating 114 may be sub-wavelength (i.e., less than a wavelength of the guided light).

In some embodiments, the diffraction grating 114 of the multibeam element 112' may be located at or adjacent to a surface of the light guide 110. For example, the diffraction grating 114 may be at or adjacent to the first surface 110' of the light guide 110, as illustrated in FIG. 7A. The diffraction grating 114 at light guide first surface 110' may be a transmission mode diffraction grating configured to diffractively couple out the guided light portion through the first surface 110' as the directional light beams 102'. In another example, as illustrated in FIG. 7B, the diffraction grating 114 may be located at or adjacent to the second surface 110" of the light guide 110. When located at the second surface 110", the diffraction grating 114 may be a reflection mode diffraction grating. As a reflection mode diffraction grating, the diffraction grating 114 is configured to both diffract the guided light portion and reflect the diffracted guided light portion toward the first surface 110' to exit through the first surface 110' as the diffractively directional light beams 102'. In other embodiments (not illustrated), the diffraction grating may be located between the surfaces of the light guide 110, e.g., as one or both of a transmission mode diffraction grating and a reflection mode diffraction grating. Note that, in some embodiments described herein, the principal angular directions of the directional light beams 102' may include an effect of refraction due to the directional light beams 102' exiting the light guide 110 at a light guide surface. For example, FIG. 7B illustrates refraction (i.e., bending) of the directional light beams 102' due to a change in refractive index as the directional light beams 102' cross the first surface 110', by way of example and not limitation. Also see FIGS. 8A and 8B, described below.

According to some embodiments, the diffractive features of the diffraction grating 114 may comprise one or both of grooves and ridges that are spaced apart from one another. The grooves or the ridges may comprise a material of the light guide 110, e.g., may be formed in a surface of the light guide 110. In another example, the grooves or the ridges may be formed from a material other than the light guide material, e.g., a film or a layer of another material on a surface of the light guide 110.

In some embodiments, the diffraction grating 114 of the multibeam element 112' is a uniform diffraction grating in which the diffractive feature spacing is substantially constant or unvarying throughout the diffraction grating 114. In other embodiments, the diffraction grating 114 is a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multibeam element 112' may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 8A:
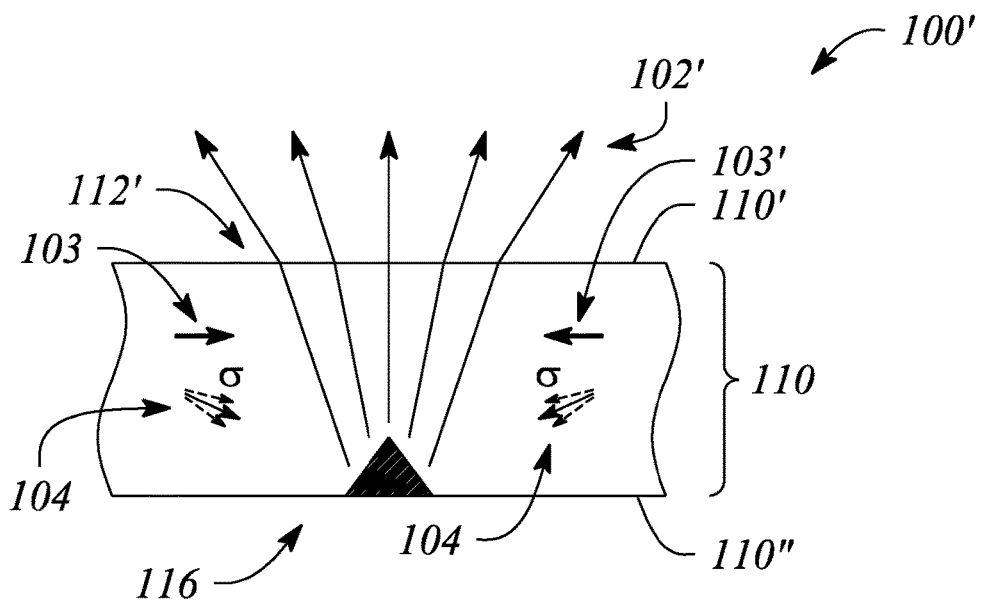
FIG. 8A illustrates a cross sectional view of a portion of a multiview backlight including a multibeam element in an example, according to another embodiment consistent with the principles described herein.
Figure 8B:
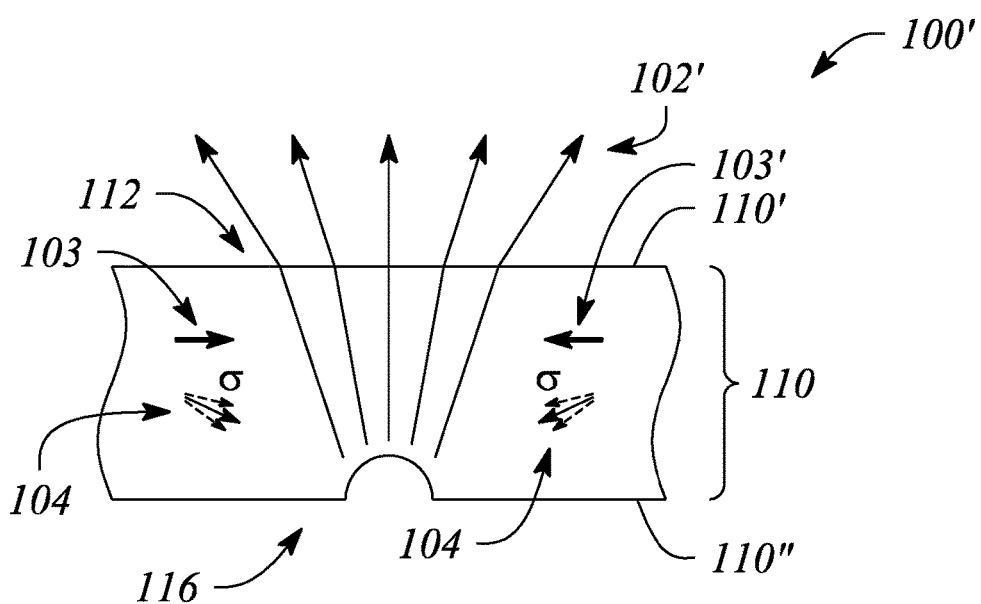
FIG. 8B illustrates a cross sectional view of a portion of a multiview backlight including a multibeam element in an example, according to another embodiment consistent with the principles described herein.

FIG. 8A illustrates a cross sectional view of a portion of a multiview backlight 100' including a multibeam element 112' in an example, according to another embodiment consistent with the principles described herein. FIG. 8B illustrates a cross sectional view of a portion of a multiview backlight 100' including a multibeam element 112' in an example, according to another embodiment consistent with the principles described herein. In particular, FIGS. 8A and 8B illustrate various embodiments of the multibeam element 112' comprising a micro-reflective element. Micro-reflective elements used as or in the multibeam element 112' may include, but are not limited to, a reflector that employs a reflective material or layer thereof (e.g., a reflective metal) or a reflector based on total internal reflection (TIR). According to some embodiments (e.g., as illustrated in FIGS. 8A-8B), the multibeam element 112' comprising the micro-reflective element may be located at or adjacent to a surface (e.g., the second surface 110") of the light guide 110. In other embodiments (not illustrated), the micro-reflective element may be located within the light guide 110 between the first and second surfaces 110', 110".

For example, FIG. 8A illustrates the multibeam element 112' comprising a micro-reflective element 116 having reflective facets (e.g., a 'prismatic' micro-reflective element) located adjacent to the second surface 110" of the light guide 110. The facets of the illustrated prismatic micro-reflective element 116 are configured to reflect (i.e., reflectively couple) the portion of the guided light 104 out of the light guide 110. The facets may be slanted or tilted (i.e., have a tilt angle) relative to a propagation direction of the guided light 104 to reflect the guided light portion out of light guide 110, for example. The facets may be formed using a reflective material within the light guide 110 (e.g., as illustrated in FIG. 8A) or may be surfaces of a prismatic cavity in the second surface 110", according to various embodiments. When a prismatic cavity is employed, either a refractive index change at the cavity surfaces may provide reflection (e.g., TIR reflection) or the cavity surfaces that form the facets may be coated by a reflective material to provide reflection, in some embodiments.

In another example, FIG. 8B illustrates the multibeam element 112' comprising a micro-reflective element 116 having a substantially smooth, curved surface such as, but not limited to, a semi-spherical micro-reflective element 116. A specific surface curve of the micro-reflective element 116 may be configured to reflect the guided light portion in different directions depending on a point of incidence on the curved surface with which the guided light 104 makes contact, for example. As illustrated in FIGS. 8A and 8B, the guided light portion that is reflectively coupled out of the light guide 110 exits or is emitted from the first surface 110', by way of example and not limitation. As with the prismatic micro-reflective element 116 in FIG. 8A, the micro-reflective element 116 in FIG. 8B may be either a reflective material within the light guide 110 or a cavity (e.g., a semi-circular cavity) formed in the second surface 110", as illustrated in FIG. 8B by way of example and not limitation. FIGS. 8A and 8B also illustrate the guided light 104 having two propagation directions 103, 103' (i.e., illustrated as bold arrows), by way of example and not limitation. Using two propagation directions 103, 103' may facilitate providing the plurality of directional light beams 102' of the emitted light 102 with symmetrical principal angular directions, for example.

Figure 9:
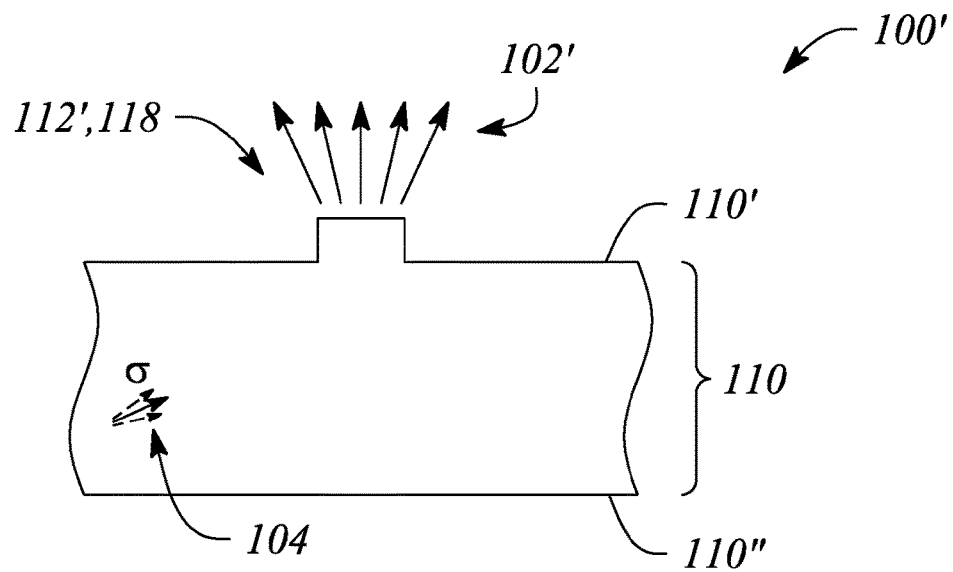
FIG. 9 illustrates a cross sectional view of a portion of a multiview backlight including a multibeam element in an example, according to another embodiment consistent with the principles described herein.

FIG. 9 illustrates a cross sectional view of a portion of a multiview backlight 100' including a multibeam element 112' in an example, according to another embodiment consistent with the principles described herein. In particular, FIG. 9 illustrates a multibeam element 112' comprising a micro-refractive element 118. According to various embodiments, the micro-refractive element 118 is configured to refractively couple out a portion of the guided light 104 from the light guide 110. That is, the micro-refractive element 118 is configured to employ refraction (e.g., as opposed to diffraction or reflection) to couple out the guided light portion from the light guide 110 as the directional light beams 102' of the emitted light 102, as illustrated in FIG. 9. The micro-refractive element 118 may have various shapes including, but not limited to, a semi-spherical shape, a rectangular shape or a prismatic shape (i.e., a shape having sloped facets). According to various embodiments, the micro-refractive element 118 may extend or protrude out of a surface (e.g., the first surface 110') of the light guide 110, as illustrated, or may be a cavity in the surface (not illustrated). Further, the micro-refractive element 118 may comprise a material of the light guide 110, in some embodiments. In other embodiments, the micro-refractive element 118 may comprise another material adjacent to, and in some examples, in contact with the light guide surface.

Referring again to FIGS. 3A-3C as well as FIGS. 6A-6C, the backlight 100 and the multiview backlight 100' may further comprise a light source 130. According to various embodiments, the light source 130 is configured to provide the light to the tapered collimator 120. In particular, the light source 130 may be located adjacent to the input end 122 of the tapered collimator 120. In some embodiments, the light source 130 may comprise a plurality of optical emitters 132. For example, when the tapered collimator 120 comprises a plurality of tapered collimator segments 120', an optical emitter 132 of the optical emitter plurality may correspond to or be located at an input end 122 of each of the tapered collimator segments 120'. As such, each tapered collimator segment 120' may received light from a different optical emitter 132 of the light source 130, e.g., as illustrated.

In various embodiments, the light source 130 may comprise substantially any source of light (e.g., optical emitter) including, but not limited to, one or more light emitting diodes (LEDs) or a laser (e.g., laser diode). In some embodiments, the light source 130 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 130 may be a substantially broadband light source configured to provide substantially broadband or polychromatic light. For example, the light source 130 may provide white light. In some embodiments, the light source 130 may comprise a plurality of different optical emitters configured to provide different colors of light. The different optical emitters may be configured to provide light having different, color-specific, non-zero propagation angles of the guided light corresponding to each of the different colors of light.

In some embodiments, the backlight 100 is configured to be substantially transparent to light in a direction through the light guide 110 orthogonal to a propagation direction 103, 103' of the guided light 104. For example, the light may be able to pass through a thickness or height of the light guide 110 from the second surface 110" to the first surface 110' or visa versa due to the transparency. Transparency may be facilitated, at least in part, due to both the relatively small size of elements that make up the angle-preserving scattering feature 112 (e.g., the multibeam elements 112'), and the relative large inter-element spacing (e.g., one-to-one correspondence with the multiview pixels 106) of the these elements.

In accordance with some embodiments of the principles described herein, a multiview display is provided. The multiview display is configured to emit modulated light beams as pixels of the multiview display. Further, the emitted modulated light beams may be preferentially directed toward a plurality of viewing directions of the multiview display. In some examples, the multiview display is configured to provide or 'display' a 3D or multiview image. Different ones of the modulated, differently directed light beams may correspond to individual pixels of different 'views' associated with the multiview image, according to various examples. The different views may provide a 'glasses free' (e.g., autostereoscopic) representation of information in the multiview image being displayed by the multiview display, for example. Uses of the multiview display include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Figure 10:
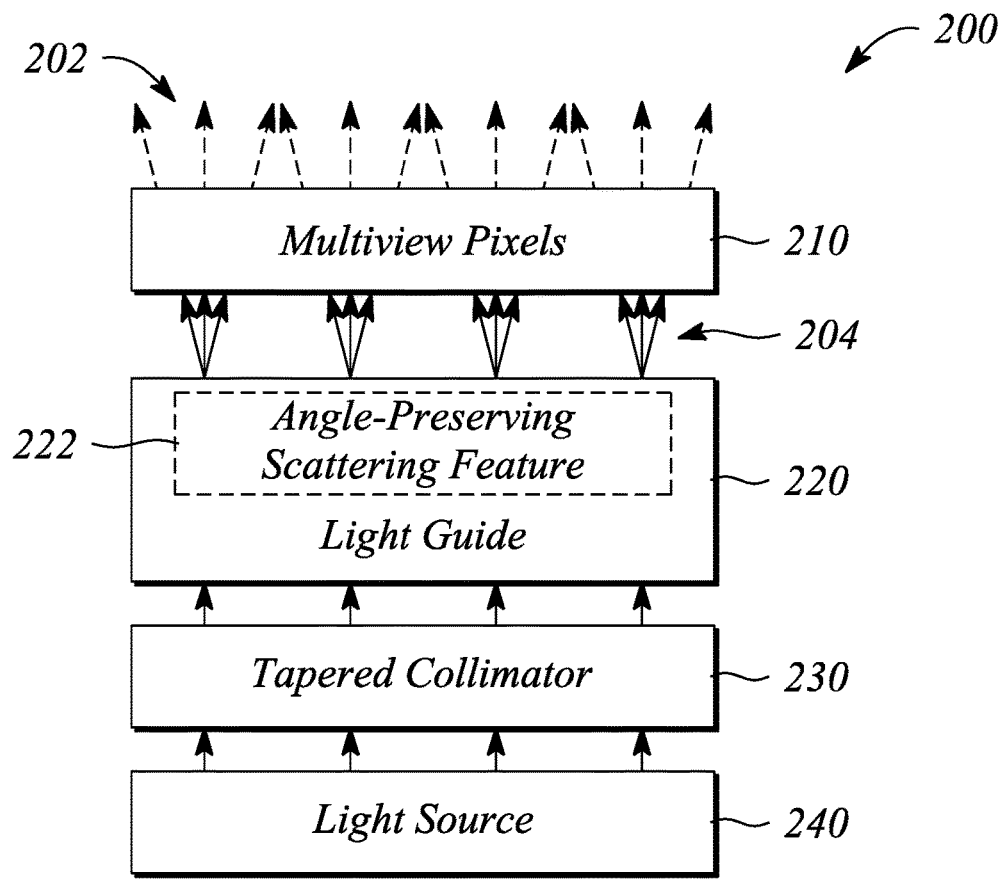
FIG. 10 illustrates a block diagram of a multiview display in an example, according to an embodiment consistent with the principles described herein.

FIG. 10 illustrates a block diagram of a multiview display 200 in an example, according to an embodiment consistent with the principles described herein. According to various embodiments, the multiview display 200 is configured to display a multiview image according to different views in different view directions. In particular, modulated light beams 202 emitted by the multiview display 200 are used to display the multiview image and may correspond to pixels of the different views (i.e., view pixels). The modulated light beams 202 are illustrated as arrows emanating from multiview pixels 210 in FIG. 10. Dashed lines are used for the arrows of the emitted modulated light beams 202 to emphasize the modulation thereof by way of example and not limitation.

The multiview display 200 illustrated in FIG. 10 comprises an array of the multiview pixels 210. The multiview pixels 210 of the array are configured to provide a plurality of different views of the multiview display 200. According to various embodiments, a multiview pixel 210 of the array comprises a plurality of view pixels configured to modulate a plurality of directional light beams 204 and produce the emitted modulated light beams 202. In some embodiments, the multiview pixel 210 is substantially similar to a set of light valves 108 of the array of light valves 108 or equivalently to the multiview pixel 106, described above with respect to the multiview backlight 100. In particular, a view pixel of the multiview pixel 210 may be substantially similar to the above-described light valve 108 or equivalently to the view pixel 106', described above. That is, a multiview pixel 210 of the multiview display 200 may comprises a set of light valves (e.g., a set of light valves 108), and a view pixel of the multiview pixel 210 may comprise a light valve (e.g., a single light valve 108) of the set.

According to various embodiments, the multiview display 200 illustrated in FIG. 10 further comprises a light guide 220 having an angle-preserving scattering feature 222. According to some embodiments, the light guide 220 is substantially similar to the light guide 110, described above with respect to the backlight 100. Further, the angle-preserving scattering feature 222 may be substantially similar to the above-described angle-preserving scattering feature 112.

In particular, the angle-preserving scattering feature 222 may comprise an array of multibeam elements optically coupled to the light guide 220, according to some embodiments. Each multibeam element of the angle-preserving scattering feature 222 is configured to provide the plurality of directional light beams 204 to a corresponding multiview pixel 210 by coupling out a portion of guided light from the light guide 220. Moreover, directional light beams 204 of the plurality of directional light beams 204 have different principal angular directions from one another. Further, the different principal angular directions of the directional light beams 204 correspond to different view direction of the different views of the multiview display 200.

According to various embodiments, a size of a multibeam element of the angle-preserving scattering feature 222 is comparable to a size of a view pixel of the view pixel plurality. For example, the size of the multibeam element may be greater than one half of the view pixel size and less than twice the view pixel size, in some embodiments. Further, an inter-element distance between multibeam elements of the angle-preserving scattering feature 222 may correspond to an inter-pixel distance between multiview pixels 210 of the multiview pixel array, according to some embodiments. For example, the inter-element distance between the multibeam elements may be substantially equal to the inter-pixel distance between the multiview pixels 210. In some examples, the inter-element distance between multibeam elements and the corresponding inter-pixel distance between multiview pixels 210 may be defined as a center-to-center distance or an equivalent measure of spacing or distance.

Further, there may be a one-to-one correspondence between the multiview pixels 210 of the multiview pixel array and the multibeam elements of the angle-preserving scattering feature 222. In particular, in some embodiments, the inter-element distance (e.g., center-to-center) between the multibeam elements may be substantially equal to the inter-pixel distance (e.g., center-to-center) between the multiview pixels 210. As such, each view pixel in the multiview pixel 210 may be configured to modulate a different one of the plurality of directional light beams 204 provided by a corresponding multibeam element. Further, each multiview pixel 210 may be configured to receive and modulate the directional light beams 204 from one and only one multibeam element, according to various embodiments.

In some embodiments, the multibeam element of the angle-preserving scattering feature 222 may be substantially similar to the multibeam element 112' of the angle-preserving scattering feature 112, described above. For example, the multibeam element may comprise a diffraction grating substantially similar to the diffraction grating 114, described above, e.g., and illustrated in FIGS. 7A-7B. In another example, the multibeam element may comprise a micro-reflective element that is substantially similar to the micro-reflective element 116, described above, e.g., and illustrated in FIGS. 8A-8B. In yet another example, the multibeam element may comprise a micro-refractive element. The micro-refractive element may be substantially similar to the micro-refractive element 118 described above, e.g., and illustrated in FIG. 9.

As illustrated, the multiview display 200 further comprises a tapered collimator 230. The tapered collimator 230 is configured to collimate light according to a predetermined collimation factor. Further, the tapered collimator 230 is configured to provide the collimated light to the light guide to be guided as the guided light. In some embodiments, the tapered collimator 230 may be substantially similar to the tapered collimator 120 described above with respect to the backlight 100. In particular, the tapered collimator 230 may have one or both of a sidewall taper and a thickness taper configure to collimate light. In some embodiments, the tapered collimator 230 may comprise a plurality of tapered collimation segments arranged along a width of the light guide 220, e.g., at an entrance edge thereof. A tapered collimation segment may have a width or sidewall taper in a plane of the light guide 220 corresponding to the light guide width, the sidewall taper providing an increase in a width of the tapered collimation segment as a function of distance from a light source adjacent end of the tapered collimation segment to an opposite end adjacent to the light guide 220.

Further, in some embodiments, the multiview display 200 may further comprise a light source 240. The light source 240 is configured to provide light to the tapered collimator 230. In some embodiments, the light may be provided to the tapered collimator 230 at or having a non-zero propagation angle. According to some embodiments, the light source 240 may be substantially similar to the light source 130 of the backlight 100 and the multiview backlight 100', described above. For example, the light source 240 may comprise a plurality of light emitting diodes (LED) or more generally a plurality of optical emitters. When the tapered collimator 230 comprises tapered collimation segments, an LED or similar optical emitter of the light source 240 may be optically coupled to and therefore provide light to the light source adjacent end of each of the tapered collimation segments.

Figure 11:
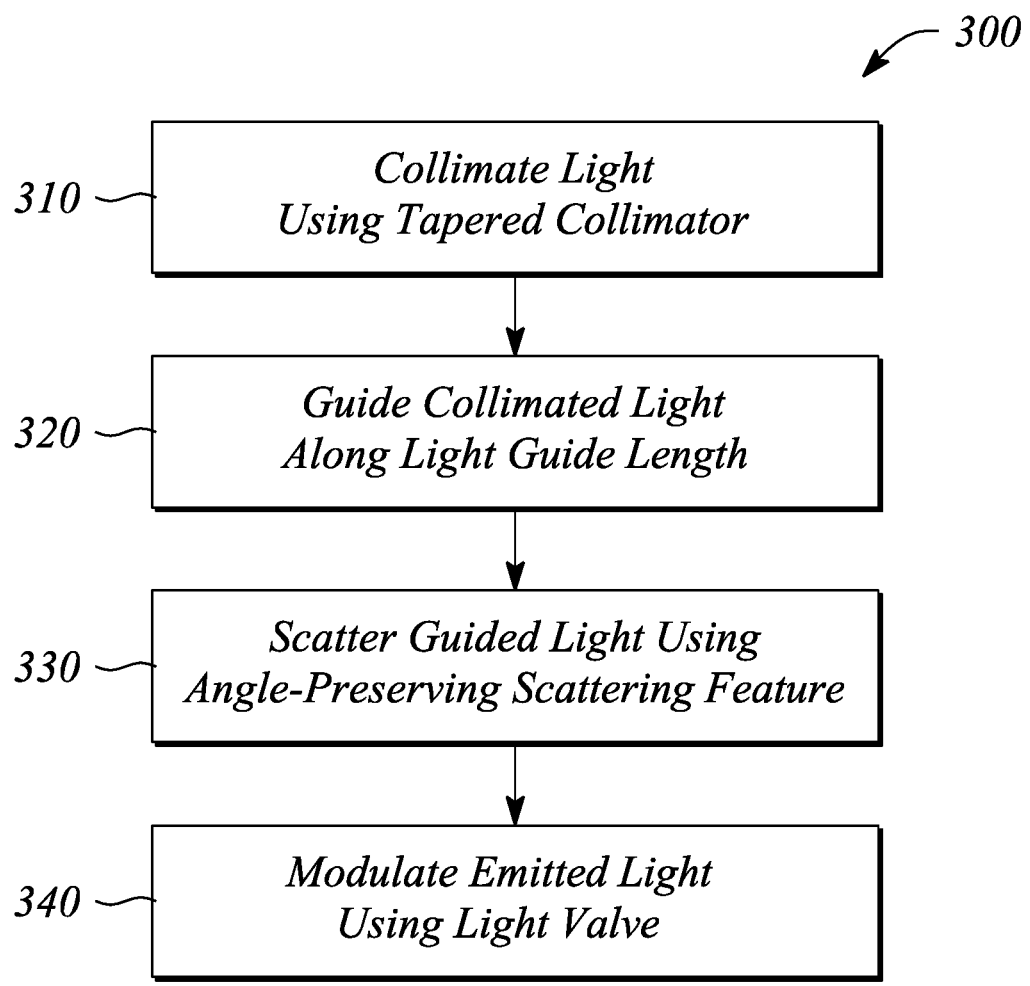
FIG. 11 illustrates a flow chart of a method of multiview backlight operation in an example, according to an embodiment consistent with the principles described herein.

In accordance with other embodiments of the principles described herein, a method of multiview backlight operation is provided. FIG. 11 illustrates a flow chart of a method 300 of backlight operation in an example, according to an embodiment consistent with the principles described herein. As illustrated in FIG. 11, the method 300 of backlight operation (or multiview backlight operation) comprises collimating 310 light using a tapered collimator. The light is collimated 310 according to a collimation factor by the tapered collimator. In some embodiments, the tapered collimator may be substantially similar to the tapered collimator 120 described above with respect to the backlight 100. For example, the collimation factor may be the above-described collimation factor $\sigma$ configure to provide a predetermined angular spread of the collimated light.

In some embodiments, the tapered collimator may comprise a plurality of tapered collimation segments. A tapered collimation segment may have a width in a plane of the light guide corresponding to a width of the light guide that increases as a function of distance from a light source adjacent input end (or input end) of the tapered collimation segment to an opposite end adjacent to the light guide. Further, the tapered collimator or equivalently the tapered collimation segment may have a thickness taper similar to the thickness taper described above with respect to the tapered collimator 120, in some embodiments.

The method 300 of backlight operation illustrated in FIG. 11 further comprises guiding 320 the collimated light in a propagation direction along a length of a light guide as guided light having the collimation factor. The collimation factor is configured to provide a predetermined angular spread of the guided light. In some embodiments, the guided light may be guided 320 at a non-zero propagation angle. According to some embodiments, the light guide may be substantially similar to the light guide 110 described above with respect to the backlight 100.

As illustrated in FIG. 11, the method 300 of multiview backlight operation further comprises scattering 330 a portion of the guided light out of the light guide using an angle-preserving scattering feature of the light guide. The scattered portion of the guided light is emitted by the backlight as emitted light. In some embodiments, the angle-preserving scattering feature may be substantially similar to the angle-preserving scattering feature 112 of the light guide 110, described above.

In particular, in some embodiments the angle-preserving scattering feature comprises a multibeam element. In these embodiments, the emitted light comprises a plurality of directional light beams having different principal angular directions from one another. In various embodiments, the different principal angular directions of the directional light beams correspond to respective different view directions of a multiview display. Further, according to some embodiments, a size of the multibeam element may be comparable to a size of a view pixel in a multiview pixel of the multiview display. For example, the multibeam element may be greater than one half of the view pixel size and less than twice the view pixel size.

In some embodiments, the multibeam element of the angle-preserving scattering feature may be substantially similar to the multibeam element 112' of the multiview backlight 100', described above. For example, the multibeam element may be a member of a plurality or an array of multibeam elements. Further, in some embodiments, the multibeam element may comprise one or more of a diffraction grating, micro-reflective element and a micro-refractive element.

In particular, according to some embodiments, the multibeam element used in scattering 330 the guided light portion may comprise a diffraction grating optically coupled to the light guide to diffractively scatter 330 or couple out the guided light portion. The diffraction grating may be substantially similar to the diffraction grating 114 of the multibeam element 112', for example. In another embodiment, the multibeam element may comprise a micro-reflective element optically coupled to the light guide to reflectively scatter 330 the guided light portion. For example, the micro-reflective element may be substantially similar to the micro-reflective element 116 described above with respect to the multibeam element 112'. In yet another embodiment, the multibeam element may comprise a micro-refractive element optically coupled to the light guide to refractively scatter 330 the guided light portion. The micro-refractive element may be substantially similar to the micro-refractive element 118 of the multibeam element 112', described above.

In some embodiments (not illustrated), the method 300 of multiview backlight operation further comprises providing light to the tapered collimator using a light source. The provided light may have a non-zero propagation angle. In some embodiments, the light source may be substantially similar to the light source 130 of the multiview backlight 100, described above. For example, the light source may provide light using a plurality of optical emitters such as, but not limited to, a plurality of light emitting diodes. When the tapered collimator comprises a plurality of tapered collimator segments, providing light may comprise separately providing light (e.g., with separate optical emitters) to an input end of each of the tapered collimator segments, for example.

In some embodiments, the method 300 of multiview backlight operation further comprises modulating 340 the emitted light using a plurality of light valves. The emitted light may comprise directional light beams and the light valves may be configured as a multiview pixel of a multiview display, in some embodiments. Further, a light valve of a plurality or array of light valves may correspond to the view pixel of the multiview pixel. According to some embodiments, the plurality of light valves may be substantially similar to the array of light valves 108 described above with respect to FIGS. 6A-6C and the multiview backlight 100'. In particular, different sets of light valves may correspond to different multiview pixels in a manner similar to the correspondence of the first and second light valve sets 108a, 108b to different multiview pixels 106, as described above. Further, individual light valves of the light valve array may correspond to view pixels of the multiview pixels as a light valve 108 corresponds to a view pixel 106' in the above-reference discussion of FIGS. 6A-6C.

Thus, there have been described examples and embodiments of a backlight, a multiview backlight, a method of backlight operation, and a multiview display that has multiview pixels comprising view pixels. The backlights, the method and the multiview display employ a tapered collimator and a light guide having an angle-preserving scattering feature to provide emitted light that, in some embodiments, includes directional light beams having directions corresponding to respective directions of plurality of different views of a multiview image. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A backlight comprising:
  a light guide configured to guide light along a length of the light guide as guided light, the light guide having an angle-preserving scattering feature configured to scatter a portion of the guided light out of the light guide as emitted light; and
  a tapered collimator between a light source and the light guide, the tapered collimator configured to collimate light provided by the light source as collimated light and to communicate the collimated light to the light guide to be guided as the guided light,
  wherein the collimated light has a collimation factor configured to provide a predetermined angular spread of the guided light, the collimation factor being a function of a taper of the tapered collimator.

2. The backlight of claim 1, wherein the collimated light provided by the tapered collimator facilitates uniform spatio-angular illumination of the light guide by the collimated light.

3. The backlight of claim 1, wherein the angle-preserving scattering feature comprises a plurality of multibeam elements spaced apart from one another along the light guide length, a multibeam element of the plurality of multibeam elements being configured to couple out from the light guide a portion of the guided light as a plurality of directional light beams having different principal angular directions corresponding to respective different view directions of a multiview display comprising multiview pixels,
  wherein a size of the multibeam element is comparable to a size of a view pixel in a multiview pixel of the multiview display.

4. The backlight of claim 3, wherein a relationship between the multibeam elements of the plurality of multibeam elements and corresponding multiview pixels of the multiview display is a one-to-one relationship, and wherein an inter-element distance between a pair of multibeam elements of the plurality of multibeam elements is equal to an inter-pixel distance between a corresponding pair of multiview pixels.

5. The backlight of claim 3, wherein the size of the multibeam element is between fifty percent and two hundred percent of the view pixel size.

6. The backlight of claim 3, wherein the multibeam element comprises one of a diffraction grating, a micro-reflective element and a micro-refractive element optically connected to the light guide to couple out the portion of the guided light.

7. The backlight of claim 1, wherein the tapered collimator comprises a plurality of tapered collimation segments arranged along a width of the light guide at an entrance edge, a tapered collimation segment having a sidewall taper in a plane of the light guide corresponding to the light guide width, the sidewall taper providing an increase in a width of the tapered collimation segment as a function of distance from a light source adjacent end of the tapered collimation segment to an opposite end adjacent to the light guide.

8. The backlight of claim 7, wherein the sidewall taper is a linear function of distance.

9. The backlight of claim 7, wherein the tapered collimation segment further comprises a thickness taper in a direction orthogonal to the sidewall taper.

10. The backlight of claim 9, wherein the thickness taper comprises a decrease in a thickness of the tapered collimation segment as a function of distance from the light source adjacent end to the light guide adjacent end of the tapered collimation segment.

11. The backlight of claim 1, wherein the tapered collimator comprises a material of the light guide.

12. The backlight of claim 1, wherein the tapered collimator further comprises surface structuring at an input end of the tapered collimator, the surface structuring being configured to provide divergence of light entering the tapered collimator from a light source.

13. A multiview display comprising the backlight of claim 1, the multiview display further comprising an array of light valves configured to modulate light beams of the emitted light, a light valve of the array corresponding to a view pixel, a set of light valves of the array corresponding to a multiview pixel of the multiview display.

14. A multiview display comprising:
an array of multiview pixels configured to provide a plurality of different views of the multiview display, a multiview pixel comprising a plurality of view pixels configured to modulate a plurality of light beams having different principle angular directions corresponding to different view directions of the different views;
a light guide having an angle-preserving scattering feature comprising an array of multibeam elements, each multibeam element being configured to provide to a corresponding multiview pixel the plurality of light beams by coupling out a portion of guided light from the light guide; and
a tapered collimator configured to collimate light according to a predetermined collimation factor and to provide the collimated light to the light guide to be guided as the guided light.

15. The multiview display of claim 14, wherein a size of a multibeam element of the multibeam element array is comparable to a size of a view pixel of the view pixel plurality, and, wherein an inter-element distance between the multibeam elements is substantially equal to an inter-pixel distance between the multiview pixels.

16. The multiview display of claim 15, wherein the size of the multibeam element is greater than one half of the view pixel size and less than twice the view pixel size.

17. The multiview display of claim 14, wherein the multibeam elements comprise one ore more of a diffraction grating, a micro-reflective element and a micro-refractive element optically connected to the light guide to couple out the portion of the guided light.

18. The multiview display of claim 14, further comprising a light source configured to provide light to the tapered collimator, the light source comprising a plurality of light emitting diodes.

19. The multiview display of claim 14, wherein the tapered collimator comprises a plurality of tapered collimation segments arranged along a width of the light guide, a tapered collimation segment having a sidewall taper in a plane of the light guide corresponding to the light guide width, the sidewall taper providing an increase in a width of the tapered collimation segment as a function of distance from a light source adjacent end of the tapered collimation segment to an opposite end adjacent to the light guide.

20. The multiview display of claim 14, wherein the multiview pixel of the multiview pixel array comprises a set of light valves, a view pixel of the multiview pixel comprising a light valve of the set.

21. A method of backlight operation, the method comprising:
collimating light using a tapered collimator according to a collimation factor;
guiding the collimated light in a propagation direction along a length of a light guide as guided light having the collimation factor, the collimation factor being configured to provide a predetermined angular spread of the guided light; and
scattering a portion of the guided light out of the light guide using an angle-preserving scattering feature of the light guide,
wherein the scattered portion of the guided light is emitted by the backlight as emitted light.

22. The method of backlight operation of claim 21, wherein the tapered collimator comprises a plurality of tapered collimation segments, a tapered collimation segment having a width in a plane of the light guide corresponding to a width of the light guide that increases as a function of distance from a light source adjacent end of the tapered collimation segment to an opposite end adjacent to the light guide.

23. The method of backlight operation of claim 21, wherein the angle-preserving scattering feature comprises a multibeam element, the emitted light comprising a plurality of directional light beams having different principal angular directions from one another, the different principal angular directions corresponding to respective different view directions of a multiview display.

24. The method of backlight operation of claim 23, wherein a size of the multibeam element is comparable to a size of a view pixel in a multiview pixel of the multiview display.

25. The method of backlight operation of claim 23, wherein the multibeam element comprises one or more of a diffraction grating optically coupled to the light guide to diffractively couple out the guided light portion, a refractive element optically coupled to the light guide to refractively couple out the guided light portion, and a reflective element optically coupled to the light guide to reflectively couple out the guided light portion as the plurality of directional light beams.

26. The method of backlight operation of claim 21, further comprising modulating the emitted light using a plurality of light valves.

* * * * *